(12) United States Patent
Wolf et al.

(10) Patent No.: US 10,883,913 B2
(45) Date of Patent: Jan. 5, 2021

(54) INDEX SORTING SYSTEMS AND METHODS FOR ANALYSIS OF QUANTITATIVE BIOLOGICAL EVENT DATA

(71) Applicant: Becton, Dickinson and Company, Franklin Lakes, NJ (US)

(72) Inventors: Christopher J. Wolf, San Jose, CA (US); David A. Roberts, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 297 days.

(21) Appl. No.: 16/005,087

(22) Filed: Jun. 11, 2018

(65) Prior Publication Data

US 2018/0357798 A1 Dec. 13, 2018

Related U.S. Application Data

(60) Provisional application No. 62/518,512, filed on Jun. 12, 2017.

(51) Int. Cl.
*G06F 16/904* (2019.01)
*G06F 16/907* (2019.01)
(Continued)

(52) U.S. Cl.
CPC .......... *G01N 15/1431* (2013.01); *G01N 15/10* (2013.01); *G01N 15/1425* (2013.01); *G01N 15/1436* (2013.01); *G01N 21/645* (2013.01); *G01N 21/6428* (2013.01); *G06F 3/04842* (2013.01); *G06F 16/2237* (2019.01);
(Continued)

(58) Field of Classification Search
CPC ............... G01N 15/1431; G01N 15/10; G01N 15/1425; G01N 15/1436; G01N 21/6428; G01N 21/645; G01N 2015/1006; G01N 2015/1081; G01N 2015/1402; G01N 2015/149; G01N 2201/12; G06F 16/907; G06F 16/2237; G06F 16/904; G06F 3/04842; G06T 11/206
See application file for complete search history.

(56) References Cited

U.S. PATENT DOCUMENTS 4,845,653 A 7/1989 Conrad et al.
5,627,040 A 5/1997 Bierre et al.
(Continued)

OTHER PUBLICATIONS

Bauer et al. (eds.), Clinical Flow Cytometry: Principles and Applications, Williams & Wilkins (Jan. 1993).
(Continued)

*Primary Examiner* — Ajay M Bhatia
*Assistant Examiner* — Phoebe X Pan
(74) *Attorney, Agent, or Firm* — Bret E. Field; Bozicevic, Field & Francis LLP

(57) ABSTRACT

Systems and methods that provide a multitude of new ways to interact with the data are provided. One purpose of index sort analysis may be to visualize where particular cells are in the plate device and on the bi-variate plots. The user can 'select' particular cell events either by clicking on the plate wells or by clicking and selecting an area of interest on the plots. The corresponding selection of cell events may then then be coordinated to maintain a consistent representation of the events on visualizations (e.g., one or more user interfaces).

14 Claims, 20 Drawing Sheets

(51) Int. Cl.
*G06F 16/22* (2019.01)
*G06F 3/0484* (2013.01)
*G06T 11/20* (2006.01)
*G01N 15/14* (2006.01)
*G01N 21/64* (2006.01)
*G01N 15/10* (2006.01)

(52) U.S. Cl.
CPC .......... *G06F 16/904* (2019.01); *G06F 16/907* (2019.01); *G06T 11/206* (2013.01); *G01N 2015/1006* (2013.01); *G01N 2015/1081* (2013.01); *G01N 2015/1402* (2013.01); *G01N 2015/149* (2013.01); *G01N 2201/12* (2013.01)

(56) References Cited

U.S. PATENT DOCUMENTS

| | | |
|---|---|---|
| 5,739,000 A | 4/1998 | Bierre et al. |
| 5,795,727 A | 8/1998 | Bierre et al. |
| 5,962,238 A | 10/1999 | Sizto et al. |
| 6,014,904 A | 1/2000 | Lock |
| 6,944,338 B2 | 9/2005 | Lock et al. |
| 9,567,645 B2 | 2/2017 | Fan et al. |
| 2003/0187716 A1* | 10/2003 | Lee .................... G06Q 30/0201 705/7.25 |
| 2008/0241820 A1* | 10/2008 | Krutzik .............. G01N 33/6848 435/5 |
| 2008/0263468 A1 | 10/2008 | Cappione et al. |
| 2010/0042351 A1* | 2/2010 | Covey ............. G01N 35/00712 702/108 |
| 2010/0138774 A1* | 6/2010 | Crosbie ........... G01N 35/00722 715/780 |
| 2011/0065193 A1* | 3/2011 | Kitagawa ......... G01N 35/00613 436/43 |
| 2012/0245889 A1 | 9/2012 | Zhu et al. |
| 2013/0226469 A1* | 8/2013 | Robinson ................ G06F 15/00 702/27 |
| 2013/0244909 A1 | 9/2013 | Windemuth et al. |
| 2018/0253194 A1* | 9/2018 | Javadi .................. G06F 3/0484 |

OTHER PUBLICATIONS

Jaroszeski et al. (eds.), Flow Cytometry Protocols, Methods in Molecular Biology No. 91, Humana Press (1998).
Landy et al. (eds.), Clinical Flow Cytometry, Annals of the New York Academy of Sciences vol. 677 (1993).
Ormerod (ed.), Flow Cytometry: A Practical Approach, Oxford Univ. Press (1994).
Pawley (ed.), Handbook of Biological Confocal Microscopy, 2nd Edition, Plenum Press (1989).
Practical Shapiro, Flow Cytometry, 4th ed., Wiley-Liss (2003).
Hinks, et al. "Parallel implementation for image rotation using parallel virtual machine", Canadian Conference on Electrical and Computer Engineering, pp. 1297-1301, 2002.
Hinks, et al. "Metadata for Parallel implementation for image rotation using parallel virtual machine", Canadian Conference on Electrical and Computer Engineering, pp. 1297-1301, 2020.

* cited by examiner

FIG. 1

INDEX SORTING SYSTEMS AND METHODS FOR ANALYSIS OF QUANTITATIVE BIOLOGICAL EVENT DATA

CROSS-REFERENCE TO RELATED APPLICATIONS

The application claims priority to U.S. Provisional Application No. 62/518,512, filed on Jun. 12, 2017, which is incorporated by reference in its entirety. Any and all priority claims identified in the Application Data Sheet, or any correction thereto, are also hereby incorporated by reference under 37 C.F.R. § 1.57.

This application is related to U.S. patent application Ser. No. 15/841,161, filed on Dec. 13, 2017, which is incorporated by reference in its entirety.

FIELD

The present application generally relates to index sorting systems and methods, specifically index sorting systems and methods for analysis of quantitative biological event data.

BACKGROUND

Particle analyzers, such as flow and scanning cytometers, are analytical tools that enable the characterization of particles on the basis of optical parameters such as light scatter and fluorescence. In a flow cytometer, for example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection. A multiplicity of different particles or components may be simultaneously detected by using spectrally distinct fluorescent dyes to label the different particles or components. In some implementations, a multiplicity of photodetectors, one for each of the scatter parameters to be measured, and one for each of the distinct dyes to be detected are included in the analyzer. The data obtained comprise the signals measured for each of the light scatter parameters and the fluorescence emissions.

Cytometers may further comprise means for recording the measured data and analyzing the data. For example, data storage and analysis may be carried out using a computer connected to the detection electronics. For example, the data can be stored in tabular form, where each row corresponds to data for one particle, and the columns correspond to each of the measured parameters. The use of standard file formats, such as a flow cytometry standard (FCS) file format, for storing data from a flow cytometer facilitates analyzing data using separate programs and/or machines. Using current analysis methods, the data typically are displayed in 2-dimensional (2D) plots for ease of visualization, but other methods may be used to visualize multidimensional data.

The parameters measured using a flow cytometer typically include the excitation light that is scattered by the particle along a mostly forward direction, referred to as forward scatter (FSC), the excitation light that is scattered by the particle in a mostly sideways direction, referred to as side scatter (SSC), and the light emitted from fluorescent molecules in one or more channels (range of frequencies) of the spectrum, referred to as FL1, FL2, etc., or by the fluorescent dye that is primarily detected in that channel. Different cell types can be identified by the scatter parameters and the fluorescence emissions resulting from labeling various cell proteins with dye-labeled antibodies.

Both flow and scanning cytometers are commercially available from, for example, BD Biosciences (San Jose, Calif.). Flow cytometry is described in, for example, Landy et al. (eds.), Clinical Flow Cytometry, Annals of the New York Academy of Sciences Volume 677 (1993); Bauer et al. (eds.), Clinical Flow Cytometry: Principles and Applications, Williams & Wilkins (1993); Ormerod (ed.), Flow Cytometry: A Practical Approach, Oxford Univ. Press (1994); Jaroszeski et al. (eds.), Flow Cytometry Protocols, Methods in Molecular Biology No. 91, Humana Press (1997); and Practical Shapiro, Flow Cytometry, 4th ed., Wiley-Liss (2003); all incorporated herein by reference. Fluorescence imaging microscopy is described in, for example, Pawley (ed.), Handbook of Biological Confocal Microscopy, 2nd Edition, Plenum Press (1989), incorporated herein by reference.

The data obtained from an analysis of cells (or other particles) by multi-color flow cytometry are multidimensional, wherein each cell corresponds to a point in a multidimensional space defined by the parameters measured. Populations of cells or particles are identified as clusters of points in the data space. The identification of clusters and, thereby, populations can be carried out manually by drawing a gate around a population displayed in one or more 2-dimensional plots, referred to as "scatter plots" or "dot plots," of the data. Alternatively, clusters can be identified, and gates that define the limits of the populations, can be determined automatically. Examples of methods for automated gating have been described in, for example, U.S. Pat. Nos. 4,845,653; 5,627,040; 5,739,000; 5,795,727; 5,962,238; 6,014,904; and 6,944,338; and U.S. Pat. Pub. No. 2012/0245889, each incorporated herein by reference.

Flow cytometry is a valuable method for the analysis and isolation of biological particles such as cells and constituent molecules. As such it has a wide range of diagnostic and therapeutic applications. The method utilizes a fluid stream to linearly segregate particles such that they can pass, single file, through a detection apparatus. Individual cells can be distinguished according to their location in the fluid stream and the presence of detectable markers. Thus, a flow cytometer can be used to produce a diagnostic profile of a population of biological particles.

Isolation of biological particles has been achieved by adding a sorting or collection capability to flow cytometers. Particles in a segregated stream, detected as having one or more desired characteristics, are individually isolated from the sample stream by mechanical or electrical removal. This method of flow sorting has been used to sort cells of different types, to separate sperm bearing X and Y chromosomes for animal breeding, to sort chromosomes for genetic analysis, and to isolate particular organisms from complex biological population.

In flow cytometry sorting, the use of index-sorting implies additional information is available that links the individual cell events to their destination locations in a collection vessel such as a plate, a tube, or a slide holder. This information may be used post-acquisition to do additional analysis of where cells are physically located on a plate device. It also allows users to see where those cells are located on bi-variate plots. Current index sort products offer very limited interaction with the data during the analysis phase

SUMMARY

In one innovative aspect, a system for coordinated graphics control is described. The system includes one or more processing devices and a non-transitory computer readable medium storing instructions that are executed by at least one of the one or more processing devices. When the instructions are executed, they cause the system to receive an identifier for a collection vessel for receiving particles of a sample and cause display of a collection interface. The collection interface includes interactive elements, each interactive element corresponding to a collection location of the collection vessel. When the instructions are executed, they cause the system to detect a selection event, the selection event identifying an interactive element included in the interactive elements. When the instructions are executed, they cause the system to cause display of a second interface for presenting a measurement for a particle of the sample, the measurement corresponding to a portion of the particles of the sample. The portion of the particles are particles that will be sorted into the collection location, one of which is the particle.

In some implementations, the identifier for the collection vessel is received as metadata for a file including the measurement for the particle, and receiving the identifier comprises receiving the file from a particle analyzer.

The instructions may further cause the system to at least receive a message from an input device, the message including the selection event.

The instructions may further cause the system to cause display of the second interface by at least causing display of the portion of particles according to a first graphical scheme and causing display of another portion of the particles according to a second graphical scheme. The first graphical scheme is perceivably different from the second graphical scheme.

In some implementations, the instructions may further cause the system to at least receive a first registration message for the collection interface and receive a second registration message for the second interface. Upon detecting the selection event, the instructions may cause the system to notify at least one of the second interface or the collection interface of the selection event.

The instructions may cause the system to receive, from an input device, a selection control signal indicating a second selection event that will be received; receive, from the input device, the second selection event identifying a second portion of the particles; add the second portion of the particles to the portion of the particles; and update at least one of the second interface or the collection interface to identify the second portion of the particles.

In some implementations, the second selection event may include an interface identifier indicating which interface was used to collect the second selection event. The interface identifier may identify the second interface. In such instances, the second selection event defines a range of particle measurement values. In some embodiments, the second interface includes a bi-variate plot, and the range is defined using a geometric shape for an area of the bi-variate plot.

In some implementations, instructions may be provided to cause the system to generate a display property for the collection location based at least in part on at least one of: (i) a measurement of particles included in the collection location or (ii) a number of particles included in the collection location.

In another innovative aspect, a computer-implemented method for coordinated graphics control is provided. The method is performed under control of one or more processing devices. The method includes receiving an identifier for a collection vessel for receiving particles of a sample. The method includes causing display of a collection interface which includes interactive elements. Each interactive element corresponds to a collection location of the collection vessel. The method further includes detecting a selection event that identifies an interactive element from among the interactive elements. The method includes causing display of a second interface for presenting a measurement for a particle of the sample, the measurement corresponding to a portion of the particles to be sorted into the collection location. The portion of the particles include the particle.

BRIEF DESCRIPTION OF DRAWINGS

FIGS. 1-1, 1-2, 1-3, 1-4, 1-5, and 1-6 illustrate portions of the user interface shown in FIG. 1.

FIG. 2 shows a logical diagram of a selection model for coordinating two different displays FIG. 3 shows selection coordination between a collection plate interface and a bi-variate plot.

FIG. 4 shows selection coordination between a collection plate interface and three different bi-variate plots.

DETAILED DESCRIPTION

Described are analytical features that provide a multitude of new ways to interact with the data is provided. One purpose of index sort analysis may be to visualize where particular cells are in the plate device and on the bi-variate plots. The user can 'select' particular cell events either by clicking on the plate wells or by clicking and selecting an area of interest on the plots. The corresponding selection of cell events may then be coordinated to maintain a consistent representation of the events on visualizations (e.g., one or more user interfaces).

The bi-directional nature of this selection mechanism during analysis is what uniquely distinguishes this workflow from other sorting products. Great care was used to make the selection mechanism uniform for both the plate and plots. This uniformity and ease of use allows the user to quickly perform the required index analysis.

Figure 1:
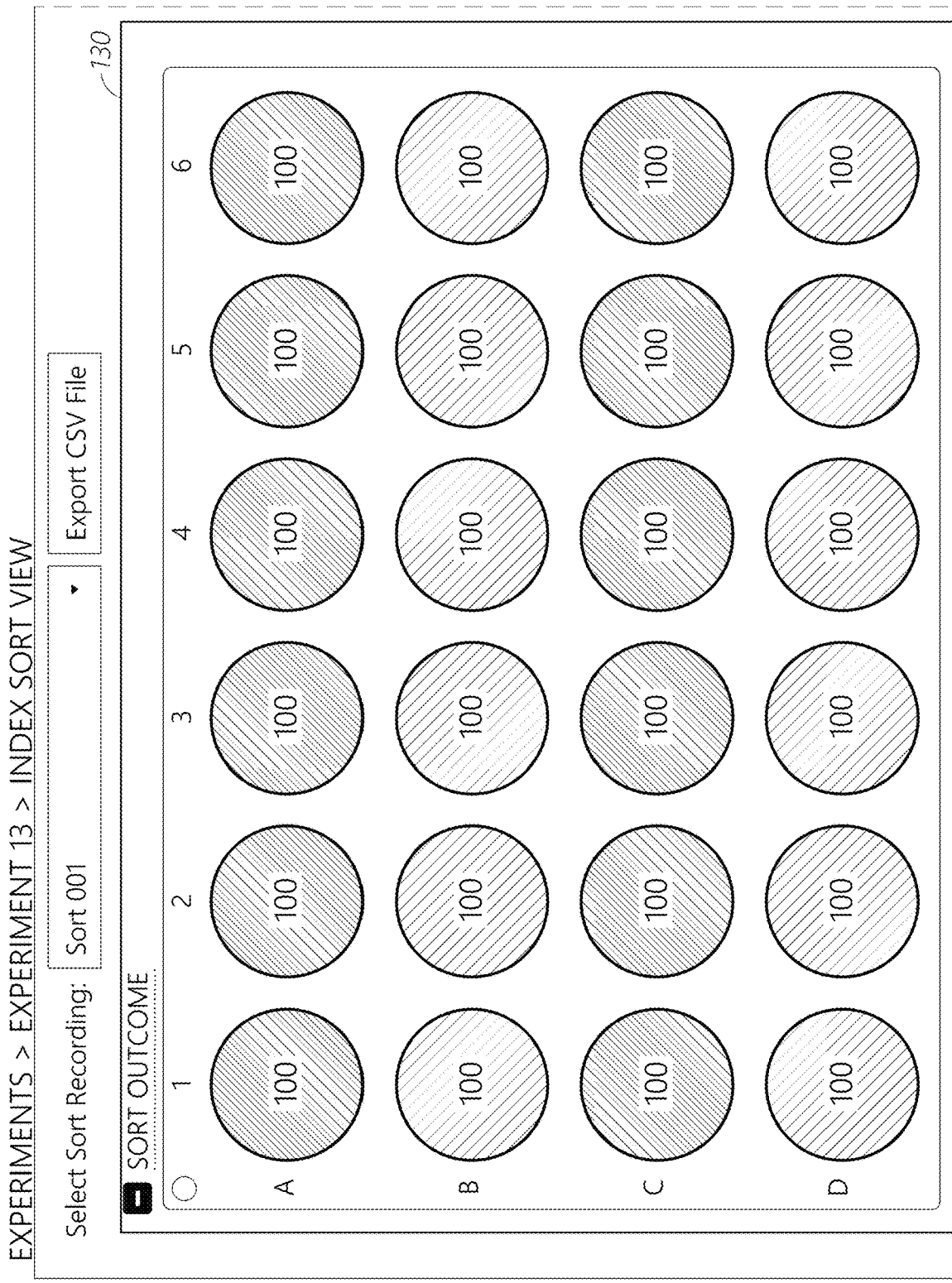
FIG. 1 illustrates a user interface for index sorting.

FIG. 1 illustrates a user interface for index sorting. The user interface 100 includes a hierarchy 140 of gates which may be applied for sorting a sample. The hierarchy 140 may include a root node representing all events for a sample. The root node may then include one or more children nodes. Some child nodes may be selected for sorting. In FIG. 1, singlets with a scatter parameter may be identified for sorting to a specific location (e.g., well, plate, etc.). By activating a control element on the interface, nodes may be added or removed from the hierarchy 140. A node may also be associated with a sort location on a plate. Accordingly, the user interface 100 may be used to define the sort logic for an experiment. Once the experiment has been run and experiment information (e.g., event data) received for an experiment, the user interface 100 may be used to present the event data. To help visualize the sorting, the user interface 100 may include a representation of a target plate 130. The target plate 130 may be a graphical element the provides a visual representation of the wells on a plate that will be used (or has been used) for an experiment. When defining sorting, before the experiment has been run, the target plate 130 or portions thereof may be selectively activated to identify well locations to associate with a gate. For example, a well in the target plate 130 may be selected and then a node in the hierarchy 140 selected to associate with the selected well.

Parameter gates may be specified using one or more population plots 110. At design time, an area of a population plot may be selected to define a population of interest. For example, a polygon may be drawn to identify an area on a two dimensional plot corresponding to x, y parameter values of interest. As a specific example, cells having certain properties may express a known range of parameters. To sort these cells, a selection of the known range of particle measurement values may be received to establish a gate for the cells of interest.

Each well within a plate index sort may be assigned a sort gate. A plate may consist of all the same sort gate, or may contain multiple distinct sort gates. Each gate belongs to a gating hierarchy: there is a parent node 'All events' for the experiment, and then the gates are children of the parent or other gates. For example, a gate for CD4 positive cells may consist of 'All Events' which has a child 'Scatter' which has another child 'Singlets' and then a final child 'CD4 positive'. The gate hierarchy may include gates that are used for sorting and gates that are parents of sort gates, along with non-sorting gates. Some gates may be used to sort some wells, but not other wells.

The user interface 100 may include a summary section 120. The summary section 120 may provide a summary of the event data for an experiment. The summary section 120 may be generated by comparing parameter data for events included in the event data with gates associated with the experiment such as those included in the hierarchy 140. The populations shown in the summary section 120 may be associated with respective control elements that, when activated, cause the user interface 100 to display information associated with the selected population(s). For example, if the P1 parameter is selected, the population plots 110 may render only those events associated with the P1 parameter.

There may be finite capacity for regions within the sort electronics and regions that are part of the experiment but not used as part of a sort gate may not be transmitted to the sort electronics. These regions may be used for quality control or other purposes. In some implementations, the sort may change sort gates for each plate well being sorted. For example, a workstation may be configured to determine that the superset of sort gates requires fewer regions than are available through the sort electronics. In such instances, it may be more efficient to transmit all sort regions prior to the experiment and then switch gates for each well. It may also be that the superset requires more regions than are available on the hardware, but by selection of initial sort regions transmitted to the cell sorting device (e.g., flow cytometer), the workstation can minimize the number of sort regions that are replaced with regions from another sort gate when moving to wells with different selected sort gates. For instance, typically there is a common subset of sort regions across sort gates that can be applied. In some implementations, the workstation may transmit non sorting regions to the cell sorting device and receive the cell sorting device's classification of the sort region. The transmission of non-sorting regions may be selectively performed based at least in part on resource constraints such as time to transmit, available sort regions in electronics, or the like.

The data to be analyzed, such as via the user interface 100 may include several pieces of information. TABLE 1 shows a summary of a portion of the particle event information that may be received for analysis. It will be noted that a particular event may appear in more than one plot (see, e.g., events 12345 and 13341 which each appear in plot id 2 and 3).

TABLE 1

| Index | X | Y | Event Id | Plot Id | Well Id |
|---|---|---|---|---|---|
| 0 | 10000 | 150000 | 10000 | 2 | 0 |
| 1 | 800 | 700 | 10000 | 3 | 0 |
| 2 | 16345 | 21987 | 12345 | 2 | 1 |
| 3 | 3789 | 98377 | 12345 | 3 | 1 |
| 4 | 56003 | 35872 | 13341 | 2 | 2 |
| 5 | 31209 | 28145 | 13341 | 3 | 2 | where:
Index identifier for an event selection;
X, Y represent the coordinates to graph for a particular plot type;
Event Id represents the event number as assigned during acquisition;
Plot Id represents the unique code for a plot on the screen; and
Well Id represents the zero-based offset for the well on a plate device.

A user interface, such as the user interface 100, presented via an electronic device (e.g., a workstation, personal computer, table computer, or the like) may utilize a single selection model to maintain the current selection of events.

Figures 1, 2:
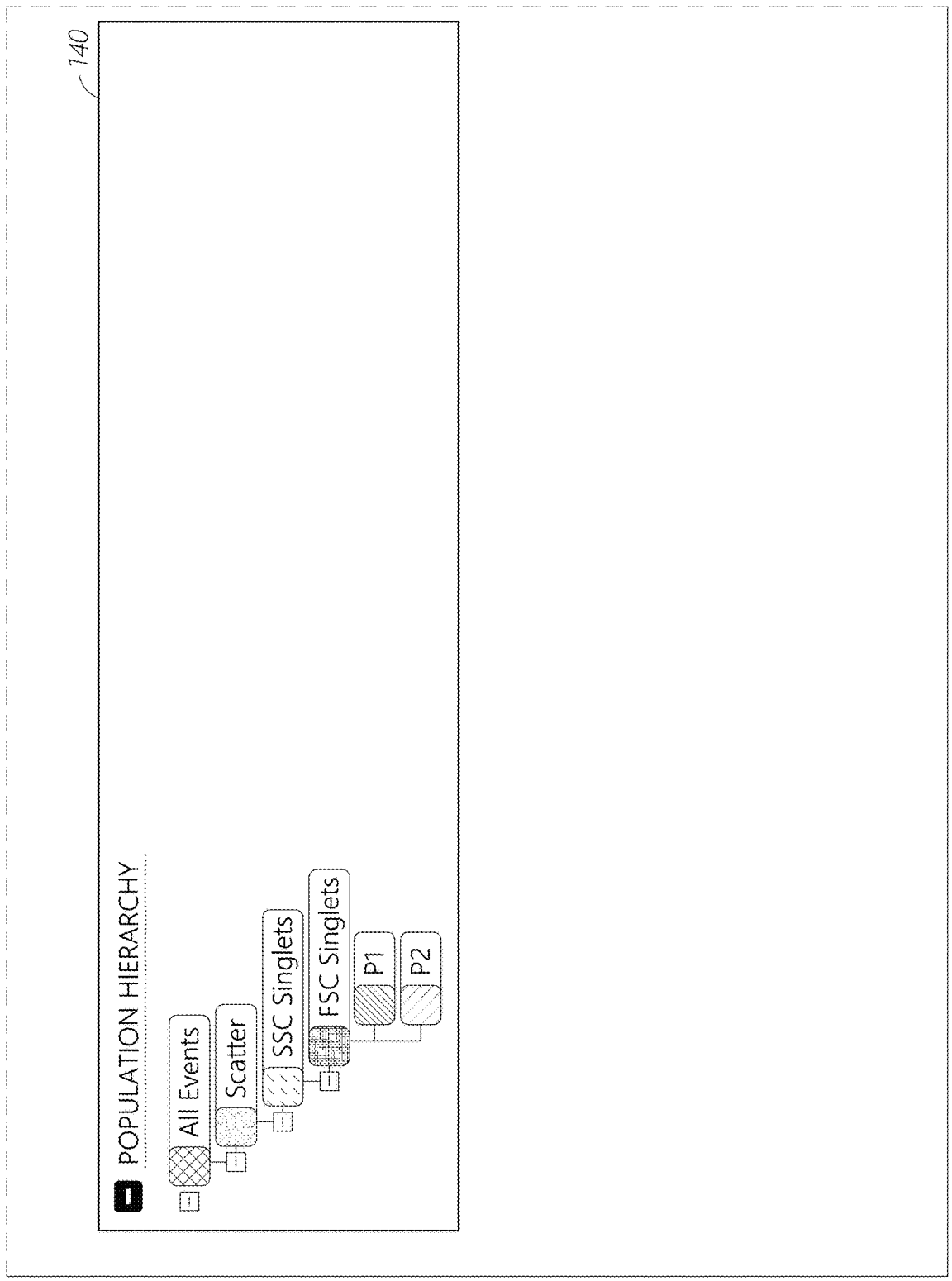

FIG. 2 shows a logical diagram of a selection model for coordinating two different displays. The selection model 202 may be a logical component or a physical state machine in communication with at least one device presenting the particle event data. The selection model 202 may maintain a list of indices into the original index sort data. Indices are used so a copy of the data is not needed and reference may be made to the original data using an index for the event. When the selection changes, devices or interface elements subscribing to the selection model 202 may receive a notification message indicating the need for an update of their graphics. Selections may be maintained in the selection model 202 and can adjust the selection state as modified by at least two possible sources of input:

1. A graphic representation 204 of collection plate consisting of a matrix of wells. These wells contain the target count of cell 'events'. Each well can hold zero events to a maximum number determined by the plate. As wells are clicked or a range is drawn, the selection model is updated with the new selection indexes.
2. A bi-variate plot 206 displaying the data collected during sorting acquisition. The cell events are displayed within the plots according to their channel information. The plots supported include dot-plot (scatter), contour, and density. When a selection tool is drawn on the plot, the events within the rectangular region change the selected events in the model.

The graphic representation 204 and the bi-variate plot 206 may be presented via the same display device or on different display devices. The coordination of selections made on either selection source may be maintained by the selection model 202. It will be appreciated that additional sources of inputs may be similarly coordinated such as additional plots, selections of events from a tabular representation of the particle measurements, or the like. The selection model may also maintain a registry of interfaces subscribing to the selection such that a change on one interface is communicated to a subscribed interface. The subscription may include an interface identifier for the interface. The interface identifier can thus be used to identify where a selection came from (e.g., which plot or graphic representation was interacted with) and to identify which interfaces a graphics control message is targeted to.

Exemplary Selection Characteristics

One factor for a low-complexity interface for index analysis is to maintain consistency and intuitiveness of the information presented via the interface. The graphical analysis workflow features described intuitive, flexible, and yet powerful. The following characteristics are described in further detail. Example characteristics include:

- Consistent uniform input device gestures—the plate device and plot allow multiple ways to select data and to append to selections using the same tools and gestures including:
  - Click-select, drag a tool region to select, hold the control key and click/drag to append, and clear the selection by clicking on an empty region
- Tools—the same tools are used to select a range of data/wells
- Appending to the selection from multiple sources—selections can be built either by selecting on a single device or by combining selections from multiple sources (plate, and multiple plots). This is referred to as bi-directional selection gestures.
- Enhanced viewing—When events are selected, the non-selected data on plots will be drawn as faded so as to enhance the selected events.

Selection of Wells within the Output Device

Once data is loaded, a representation of the collection device used for the experiment may be shown. The collection device may be identified as metadata included with the particle event information. The collection device may be identified before collection, such as part of experimental set up. A user can activate start portions of the interface associated with specific wells such as by using an input device such as a mouse.

Figures 1, 2, 3:
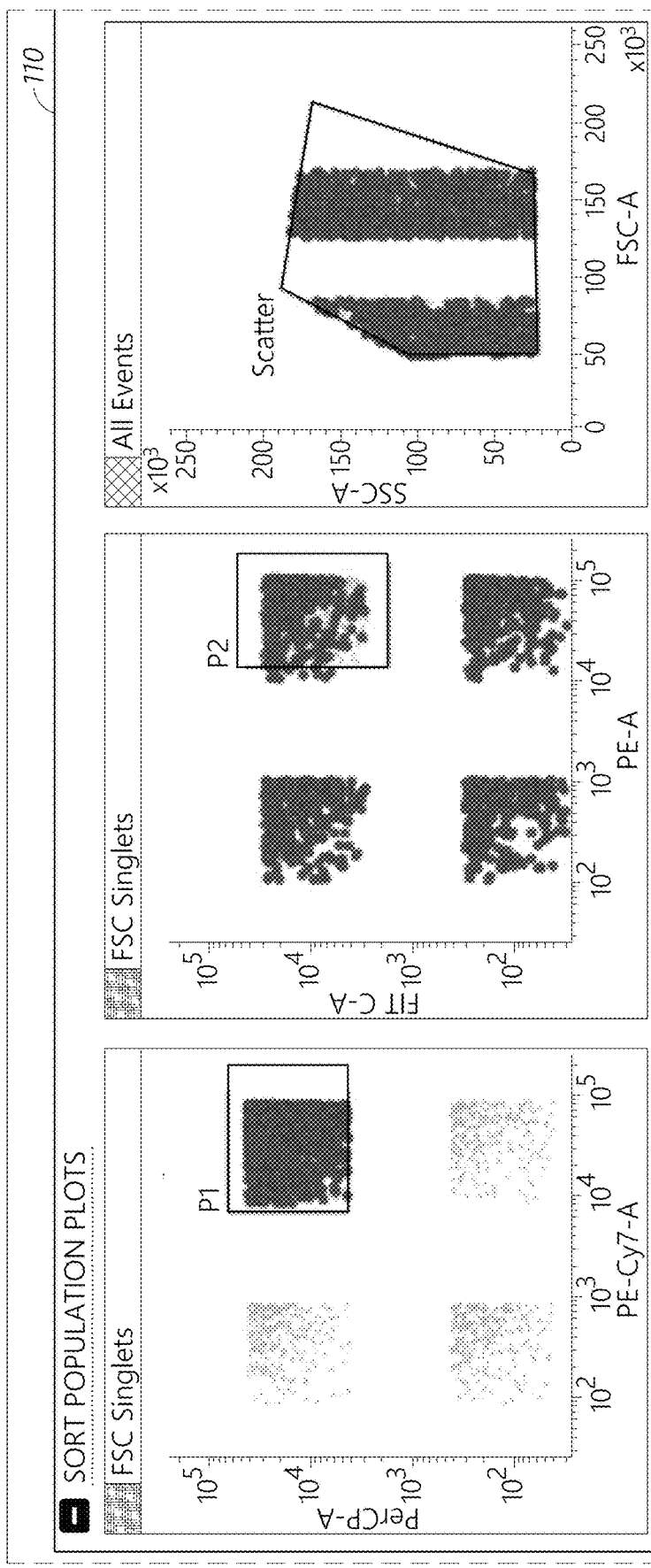

FIG. 3 shows selection coordination between a collection plate interface and a bi-variate plot. In a collection plate interface 310, each well may be associated with an interactive control element that, when activated, causes selection of the events sorted or to-be-sorted into the selected well. A selected well 312 may change a visual property such as changing color, adding a boundary around the well, or other perceivable interface indication.

As wells are selected, the bi-variate plot 320 may be adjusted to highlight the events corresponding to the selected wells. In FIG. 3, the selected well 312 includes 1 event which is shown in the bi-variate plot 320 as point 322. The number of events for a given well may be included in the collection plate interface 310. For example, the well at location D5 includes a 6 in the well area. This number indicates that there are 6 events sorted into this well.

The wells may also communicate classification information using a graphical scheme. The graphical scheme may be a set of display properties such as color, shape, shading, or icons, for representing events. The graphical scheme may be a general scheme for all users or may be dynamically identified based on the experiment, sample, user, or other detectable characteristic. The events in rows A and B may be associated with a first classification (e.g., population of interest) whereas the events in row E and F are associated with a second classification. The color of the wells may correspond to the color used to render the events on the bi-variate plot 320.

For purposes of discussion, the vessel represented by the collection plate interface 310 is a plate. A similar example is used in other figures, but it will be understood that different sized plates or different collections vessels may be represented using the features described in this application.

Multiple Well Selection

In some implementations, the selection process can be contiguous or non-contiguous such as by holding down the control-key while selecting different areas shown on the user interface corresponding to wells of a collection plate. Multiple wells can be selected, and their corresponding event may be shown in all plots using an associated well color. For example, a user may activate the control element associated with well A1 and, using a predetermined input sequence, indicate the desire to add to the selection. This then causes a subsequent selection to be added to the selection of A1.

Figures 1, 2, 3, 4:
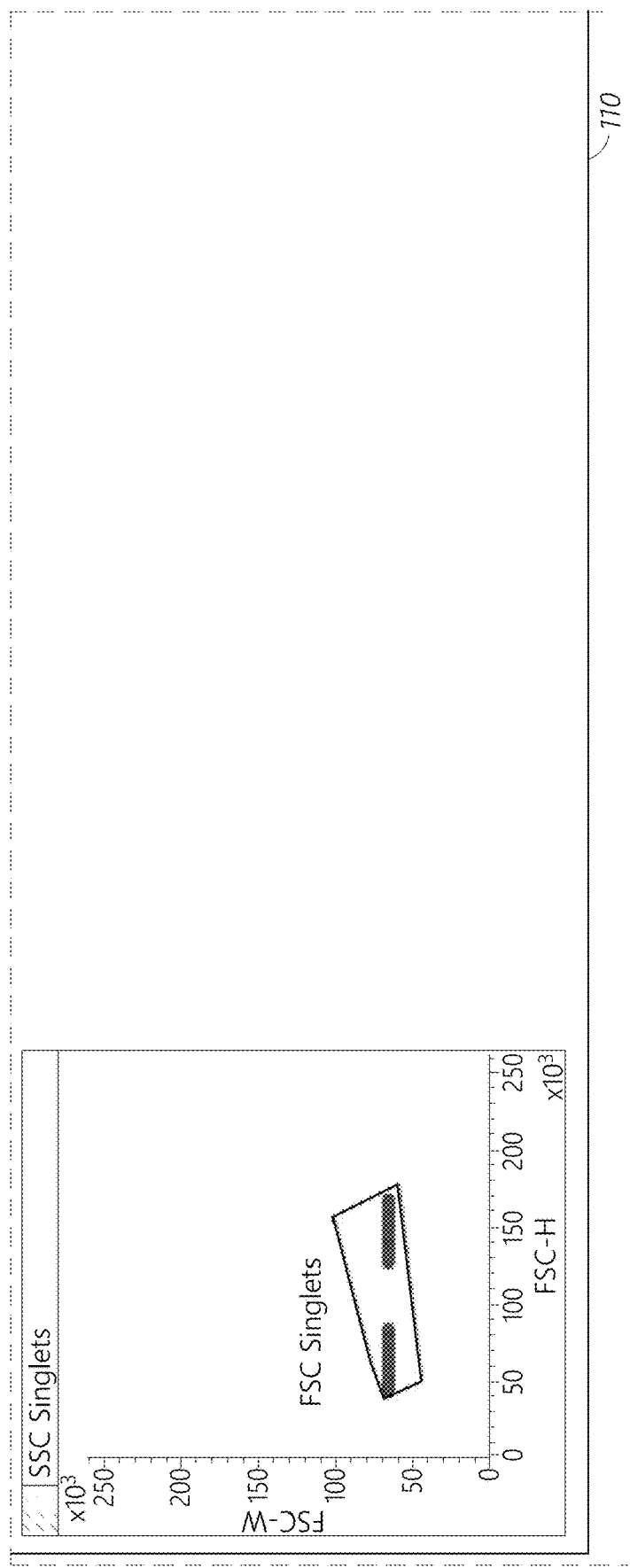
Figures 1, 2, 3, 4, 5:
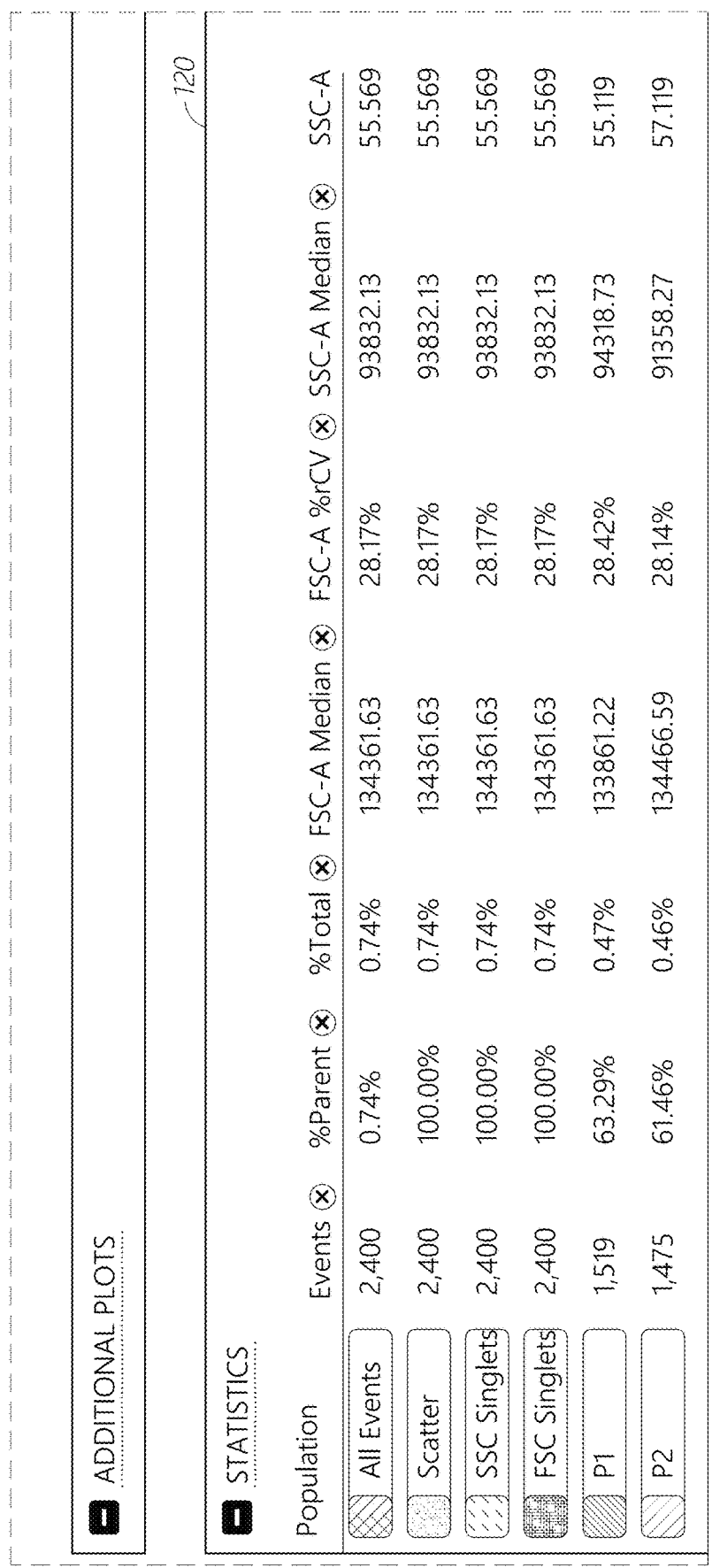
Figures 1, 2, 3, 4, 5, 6:
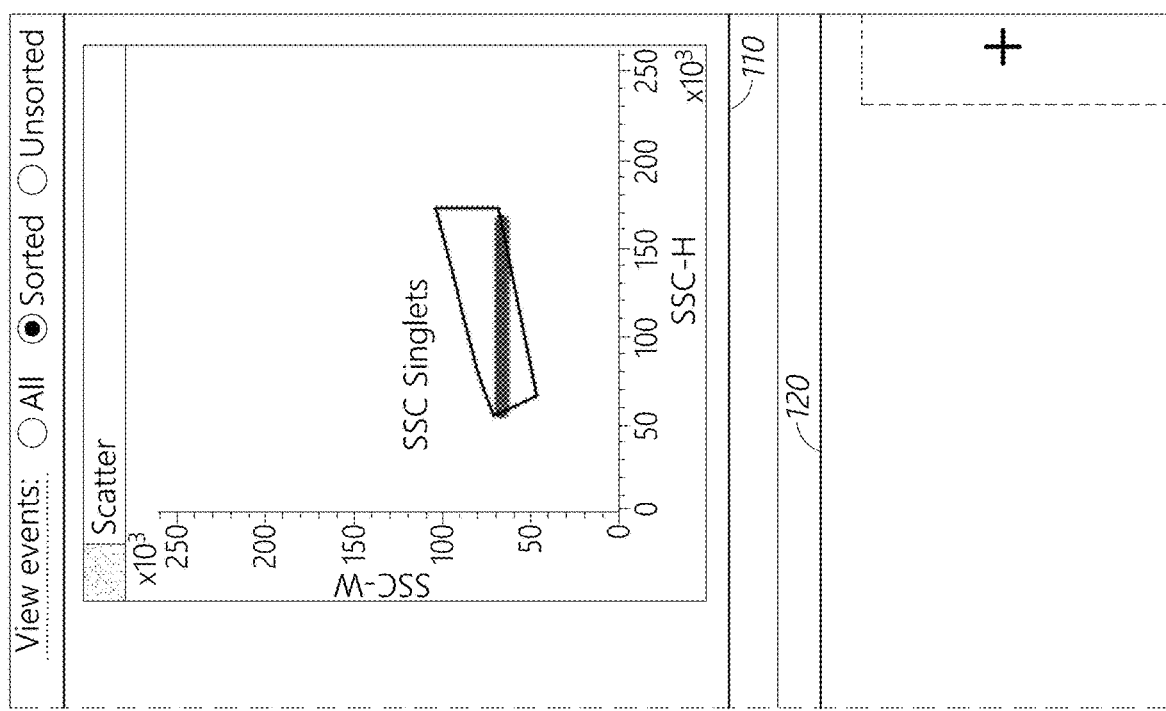
Figure 2:
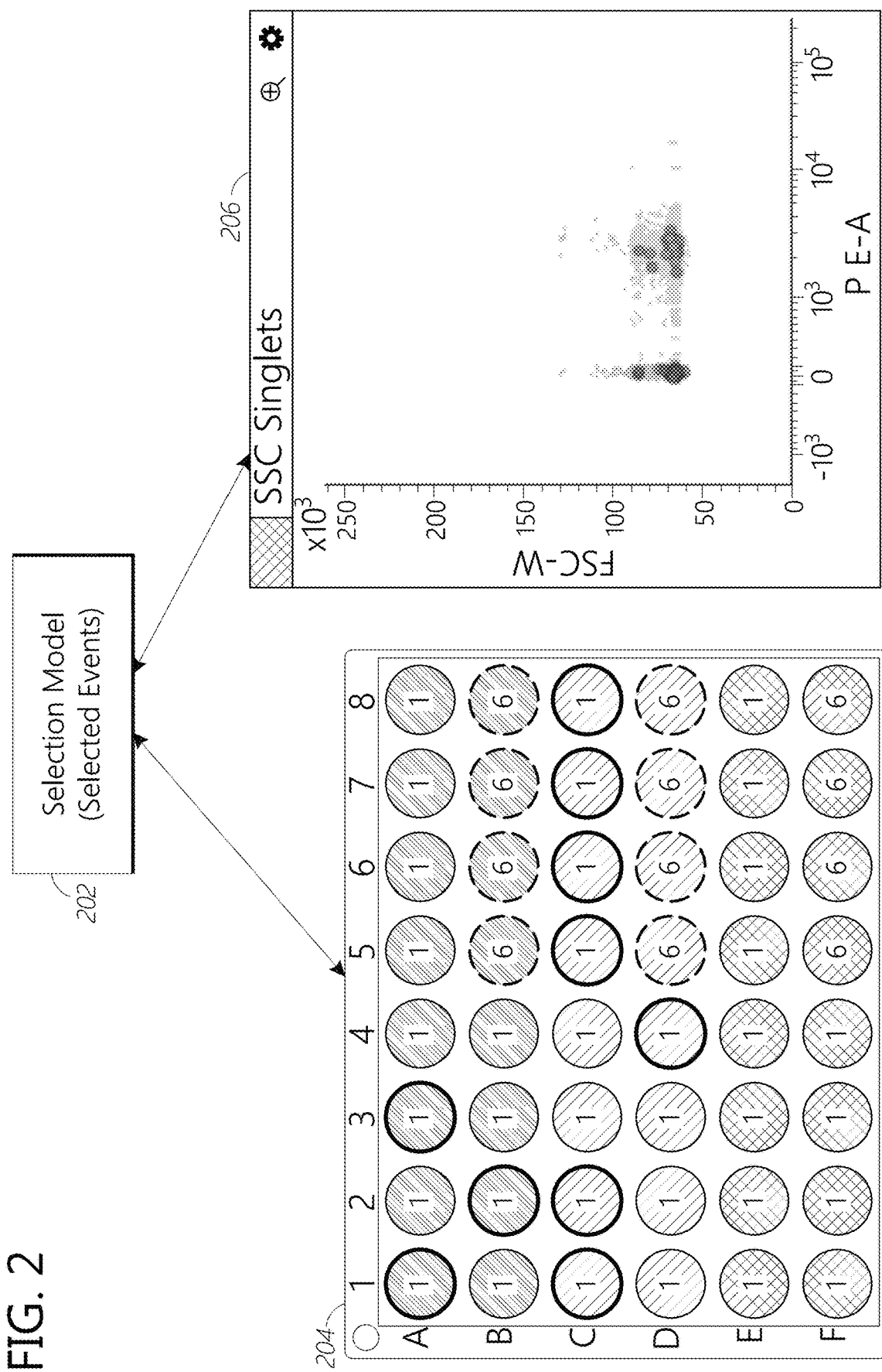
Figure 3:
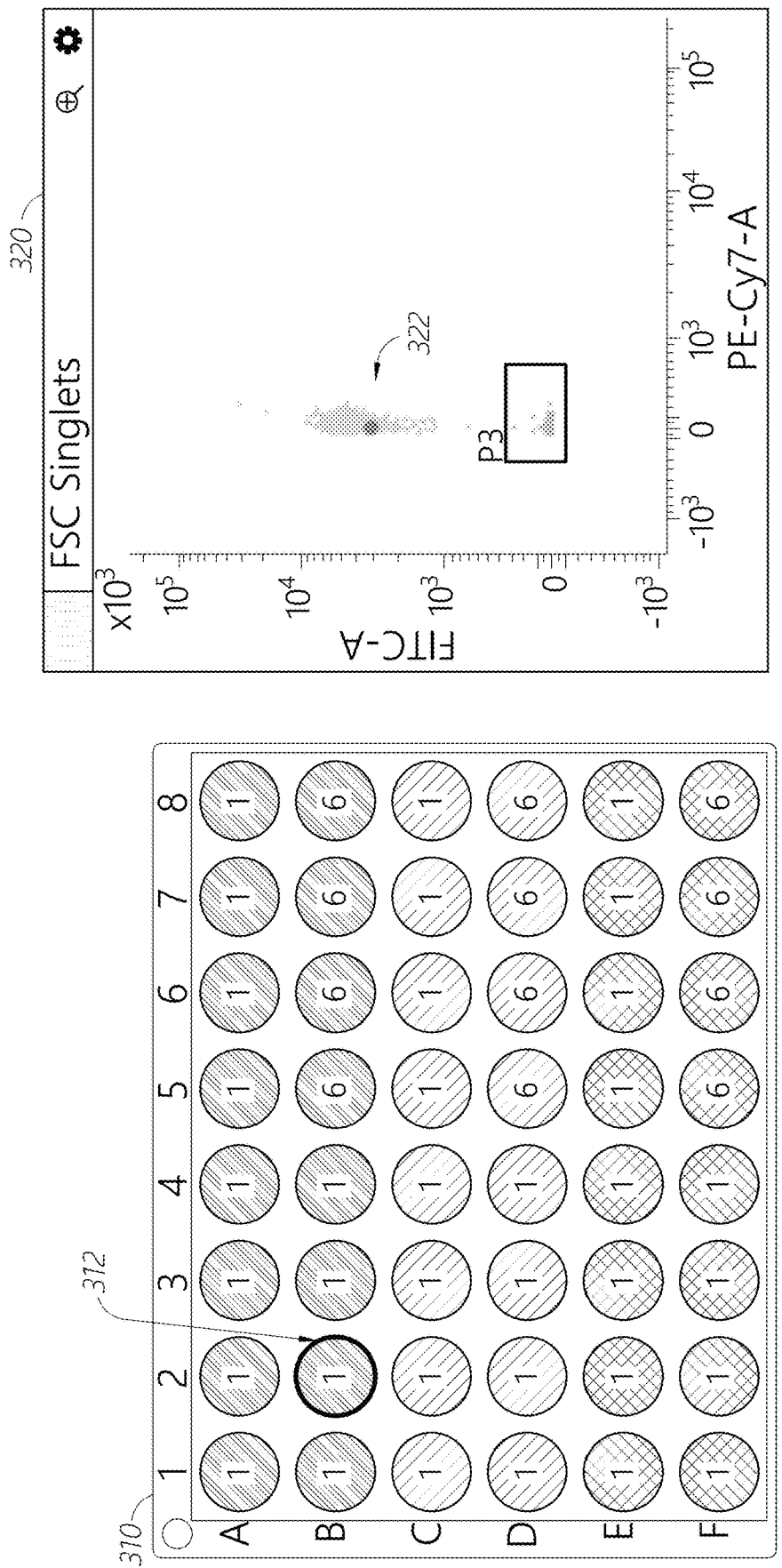
Figure 4:
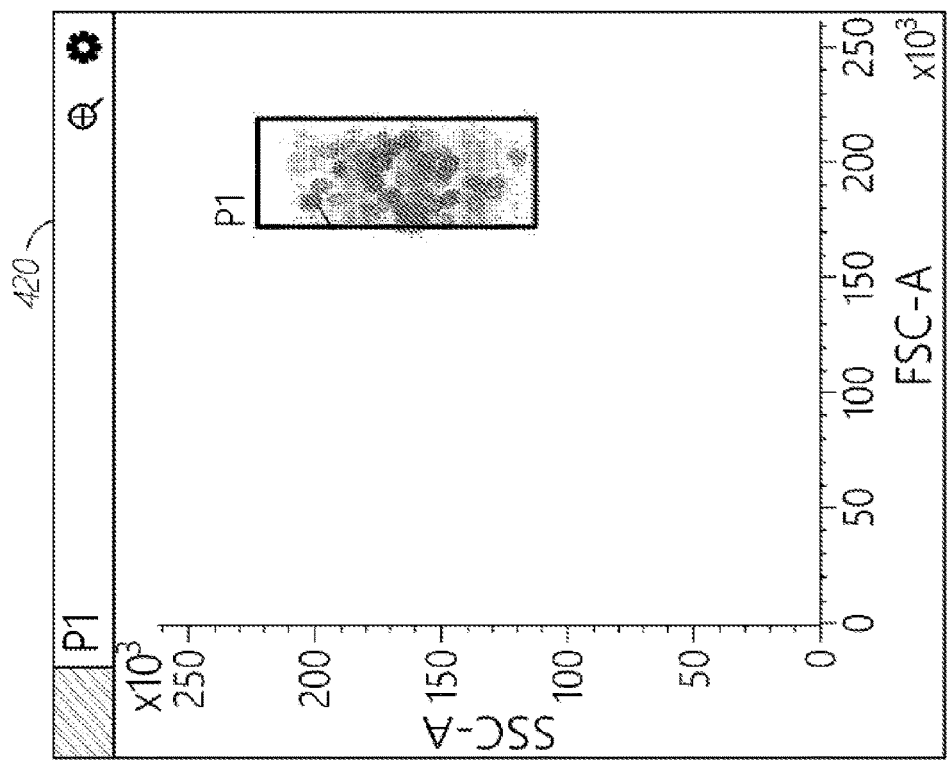
Figure 4:
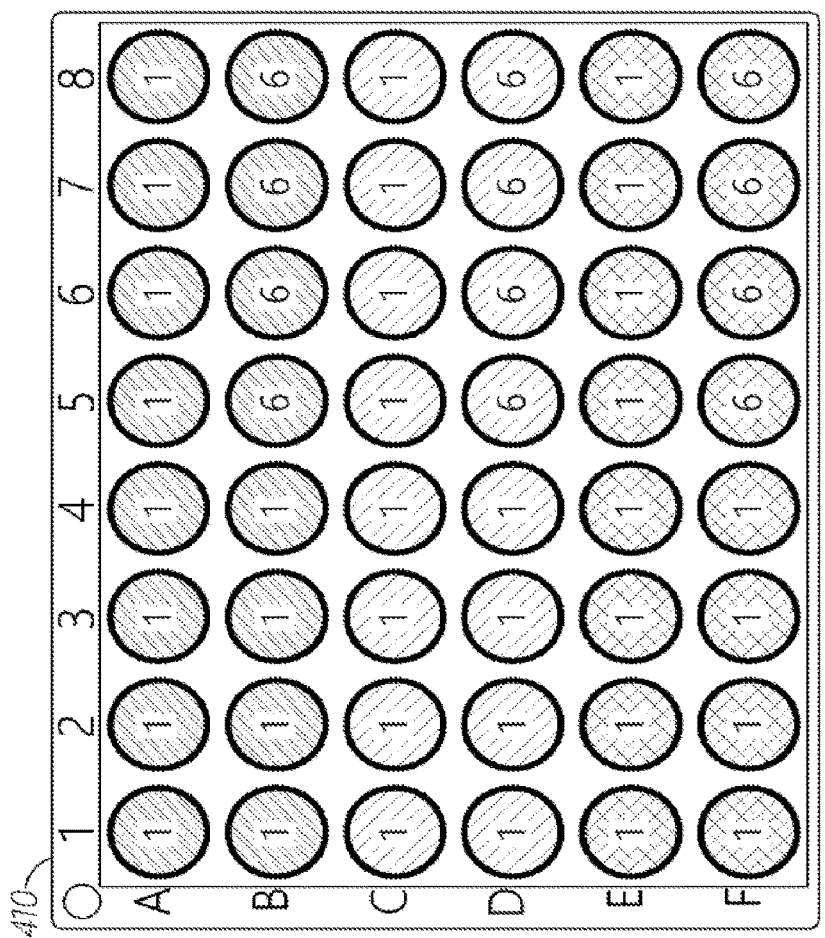
Figure 4:
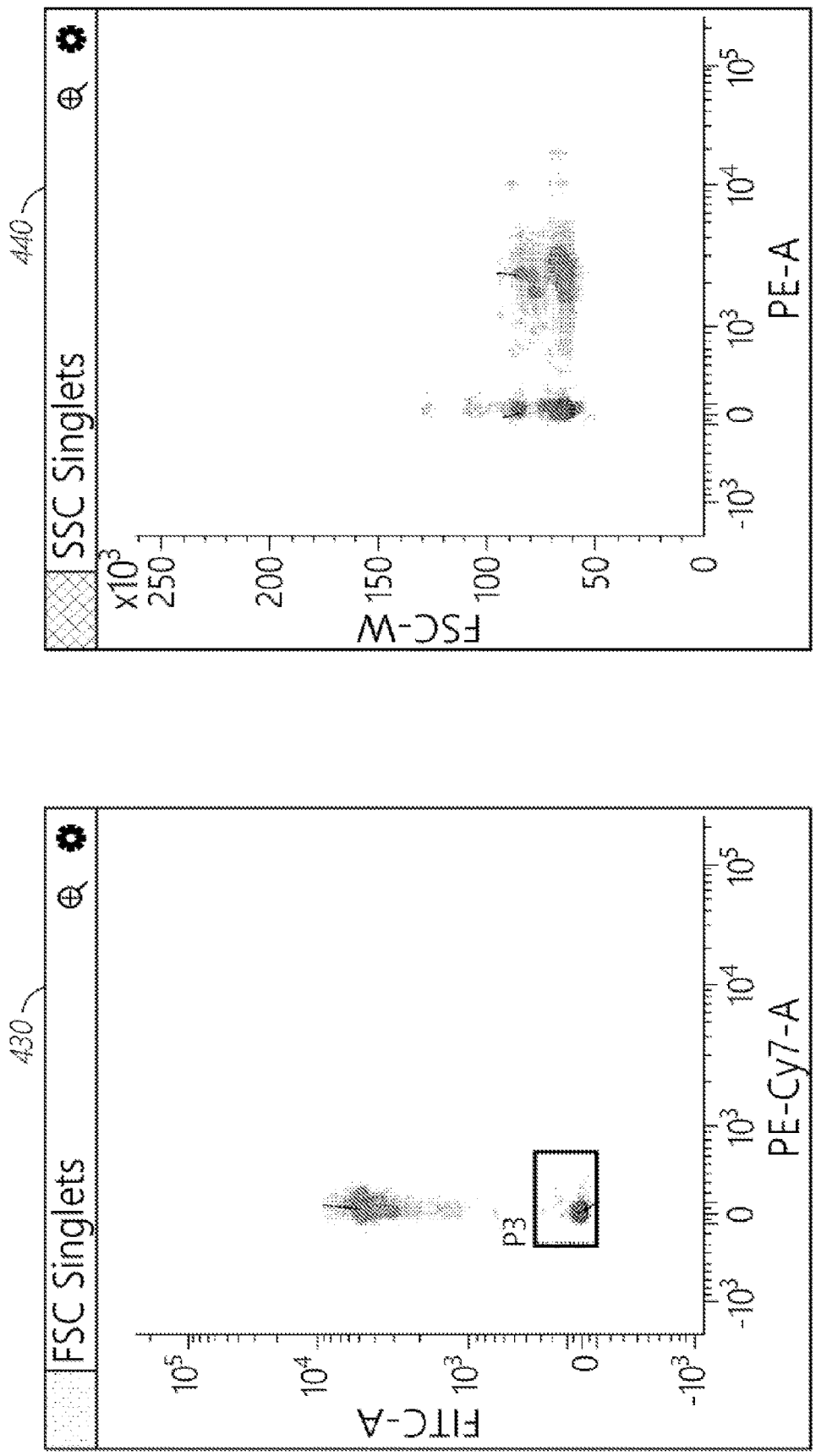
Figure 5A:
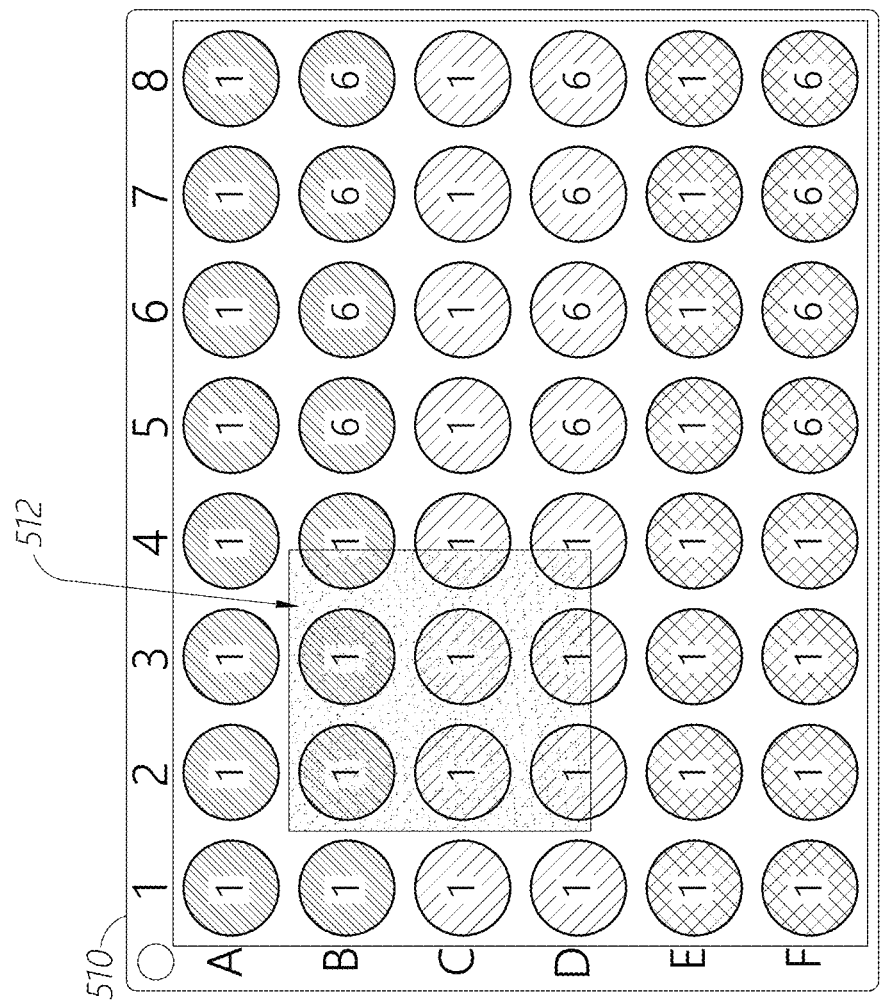
FIG. 5A through FIG. 5C show how a contiguous selection may be performed.
Figure 5B:
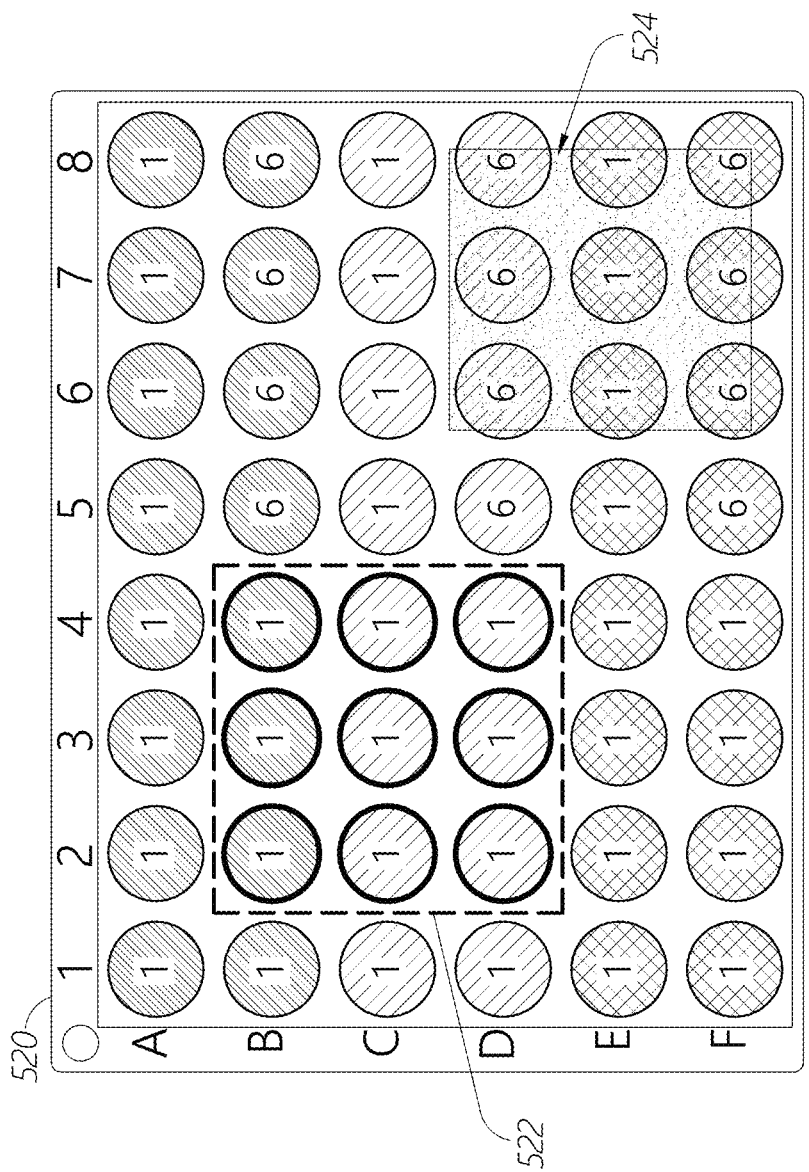
Figure 5C:
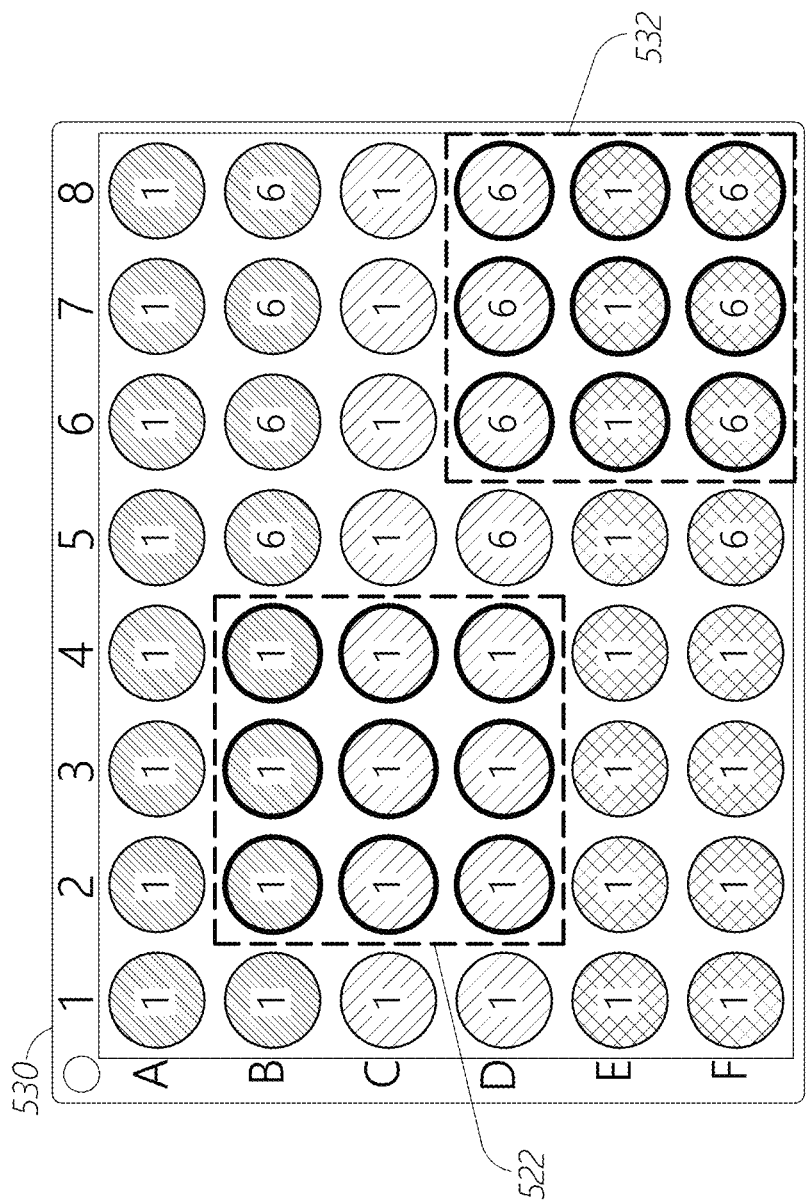

FIG. 4 shows selection coordination between a collection plate interface and three different bi-variate plots. A collection plate interface 410 shows all events selected. In such instance, a first bi-variate plot 420, a second bi-variate plot 430, and a third bi-variate plot 440 are adjusted to Contiguous Selection FIG. 5A through FIG. 5C show how a contiguous selection may be performed. In FIG. 5A, a first range of wells 512 are selected from a collection plate interface 510. In some implementations, a contiguous selection may be achieved using a selection tool such as by drawing a geometric shape around the dell or wells of interest. Holding the control key will allow additional wells to be added to the selection.

In FIG. 5B, the first range of wells may be presented on a collection plate interface 520 with adjustments to indicate they have been selected. The adjustment may include changing the border of the well, changing the color of the well, or other perceivable indication of selection. A first selection 522 may be maintained by the selection model when a user input indicating a second range of wells 524 is received. The user input may include receipt of an input associated with a predetermined key or key sequence indicating that additional selections are to be added to an existing selection.

In FIG. 5C, once the second selection is complete, a collection plate interface 530 may present both the first selection 522 and a second selection 532 corresponding to the second range of wells 524.

Selection of Cell Events within Plots

While FIGS. 2 through 5C discuss selections starting with a collection plate interface, particle events in the plots can also be selected for coordination with other plots and collection plate interfaces. This bi-directional selection is in contrast to other implementations which allow only well selection.

Figure 6A:
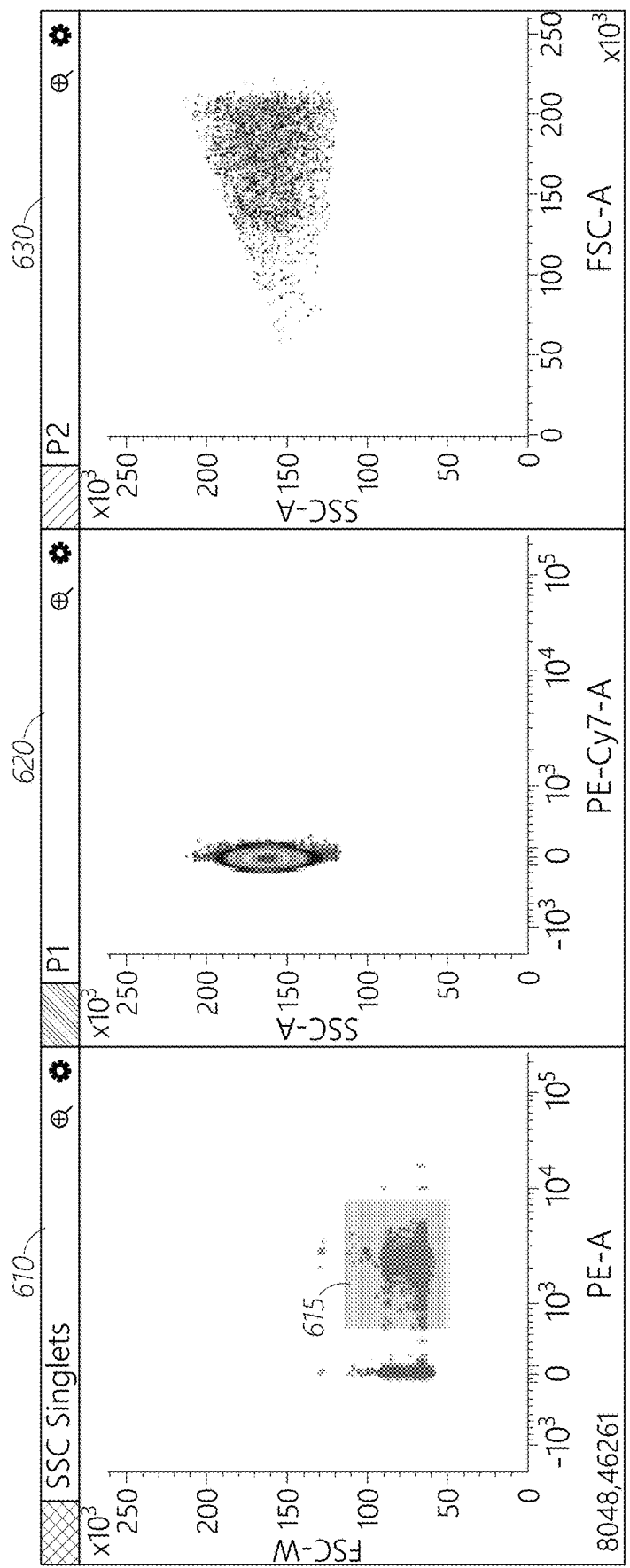
FIG. 6A shows three bi-variate plots with a selection performed on one of the plots.

FIG. 6A shows three bi-variate plots with a selection performed on one of the plots. The selection 615 is shown on an SSC singlets plot 610. The selection 615 may be performed on another plot such as the P1 plot 620 or the P2 plot 630.

Figure 6B:
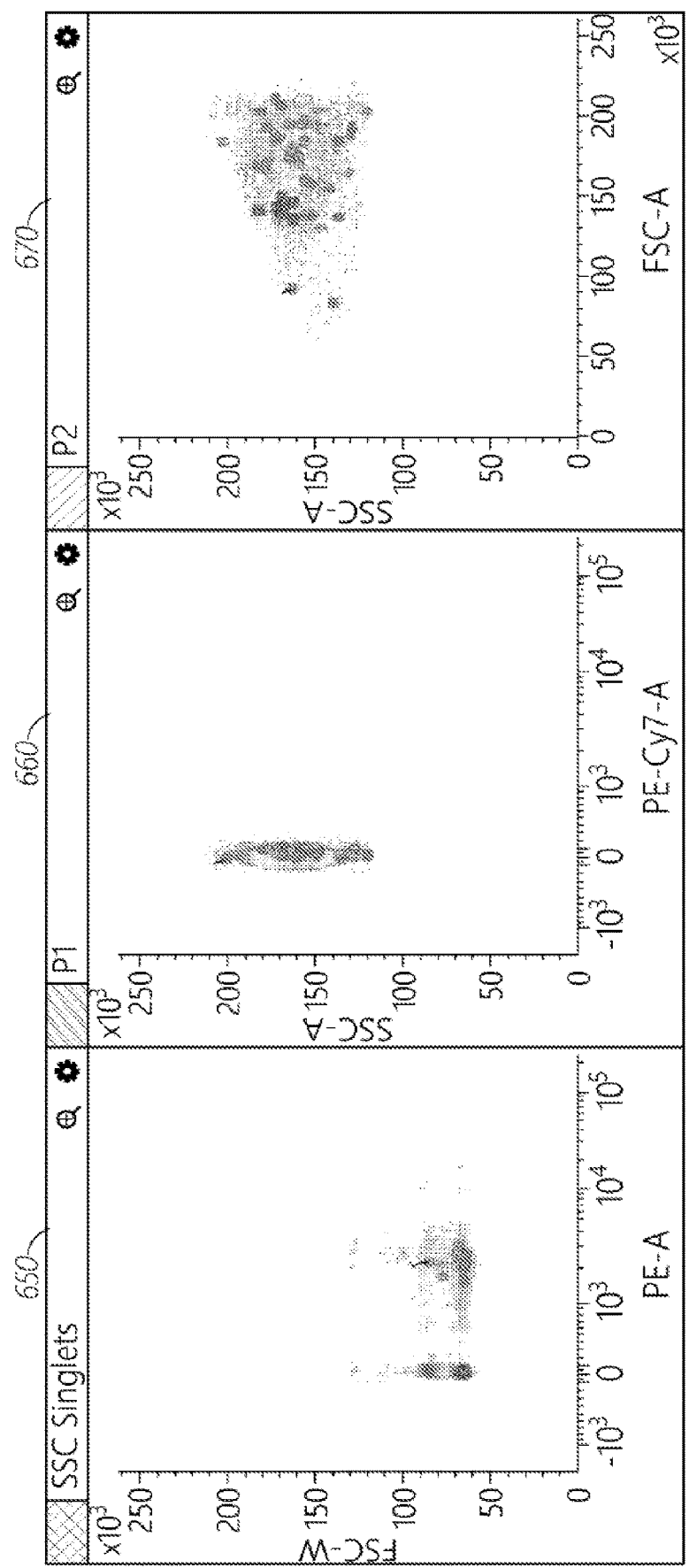
FIG. 6B shows the three bi-variate plots after selection.

FIG. 6B shows the three bi-variate plots after selection, the SSC singlets plot 650, the P1 plot 660 and the P2 plot 670. As shown in FIG. 6B, events within the selection 615 are distinguished from other events shown. The distinction includes changing an identifier for the event (e.g., dot to a circle) as well as changing the representation of events outside the selection 615. As shown, the color used to represent non-selected events is faded as compared to their representation in FIG. 6A.

Although not shown, a collection plate interface would be similarly adjusted to reflect those wells which include events included in the selection 615.

Partial Selection of Wells

In the case of event selection using the plots, a particular well may not have all of the events in that well selected. In this case a slightly different color may be used to indicate a partially selected well.

Figure 7:
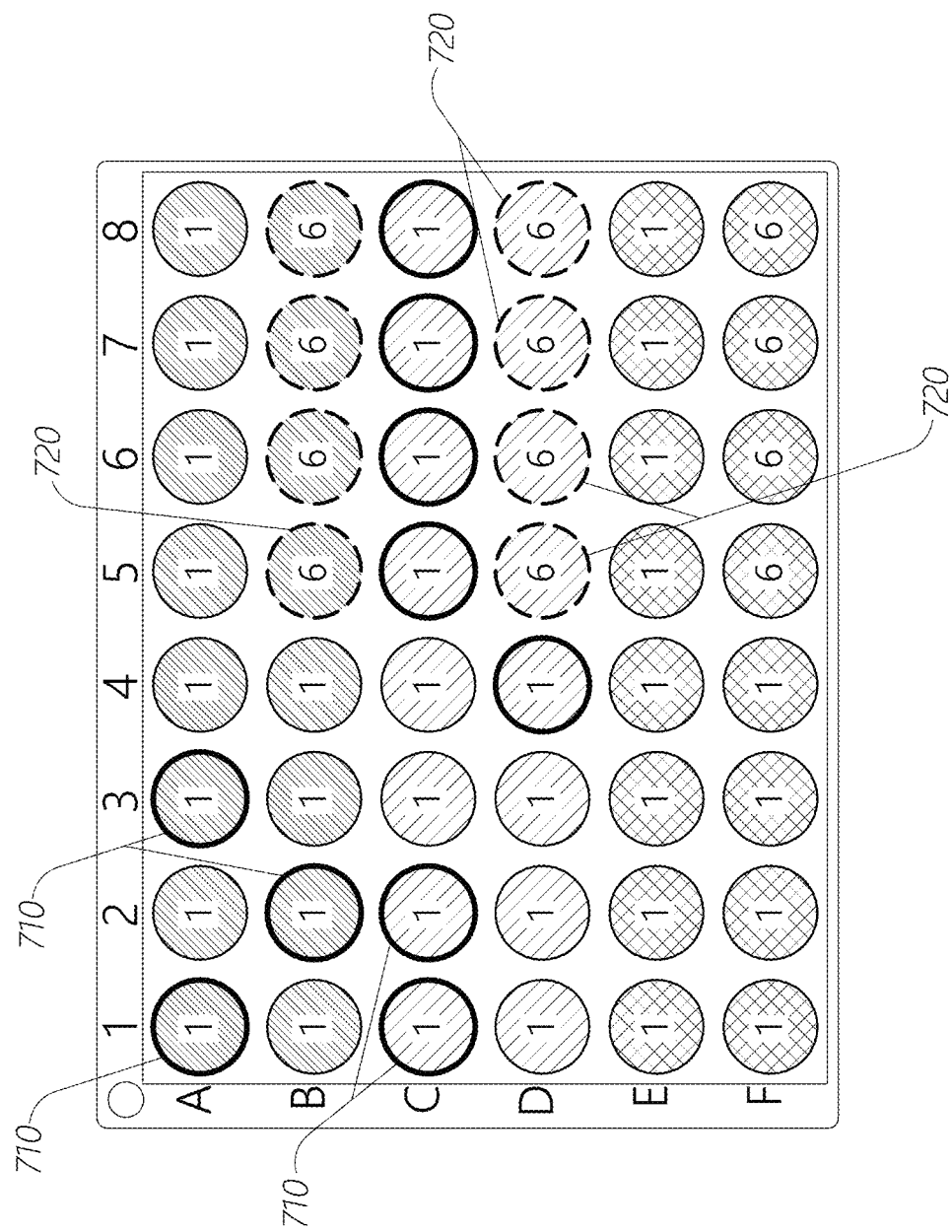
FIG. 7 shows a collection plate with wells including partially selected events.

FIG. 7 shows a collection plate with wells including partially selected events. The difference in selection for wells that have a full selection (e.g., 710) versus partially selected set of events (e.g., 720). The difference may be indicated using color, shading, or other perceivable indicator that can be represented via a user interface.

Operational Environment Examples

Figure 8:
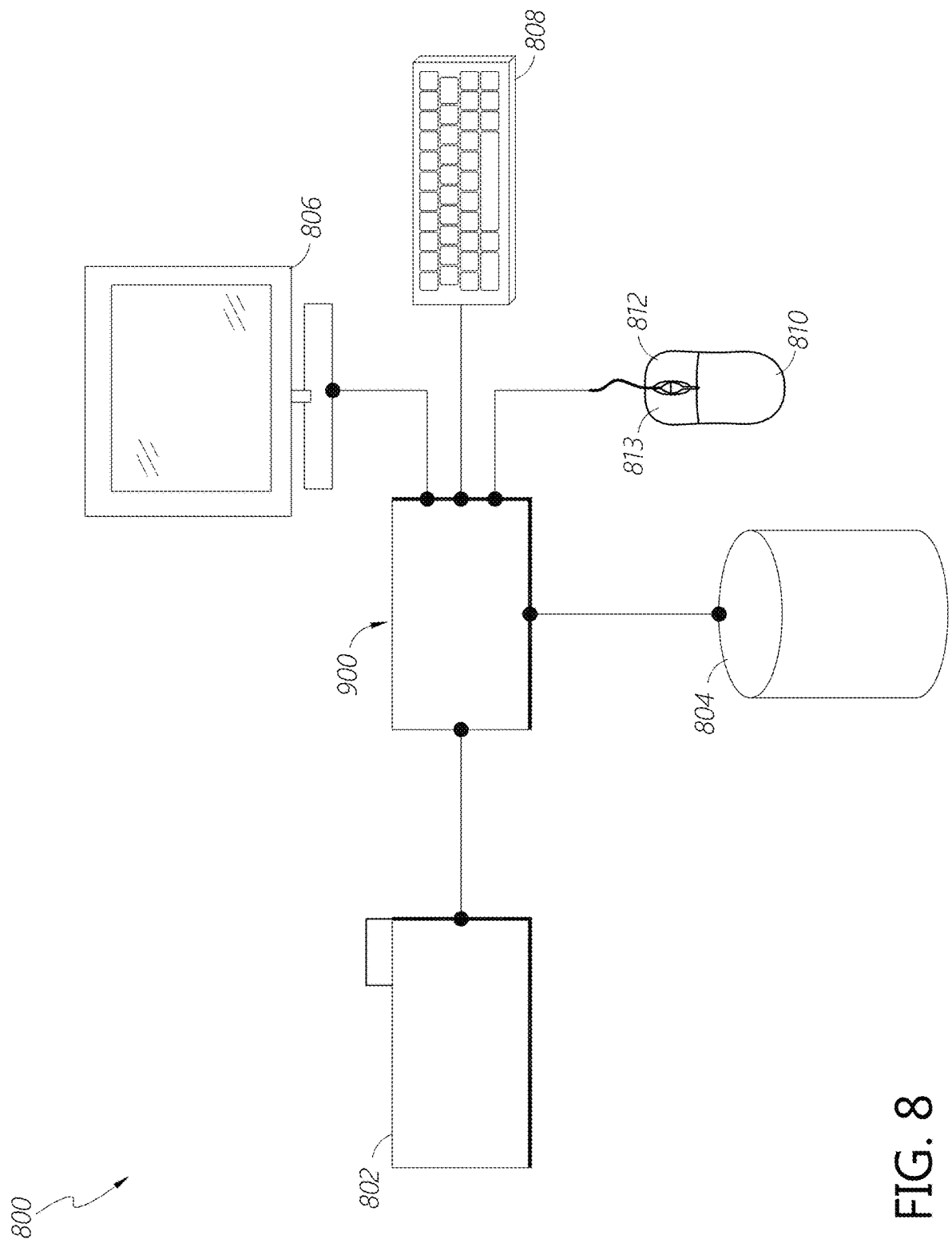
FIG. 8 shows a functional block diagram for one example of a graphics control system for analyzing and displaying particle event data.

FIG. 8 shows a functional block diagram for one example of a graphics control system for analyzing and displaying particle event data. A graphics controller 900 may be configured to implement a variety of processes for controlling graphic display of particle event data such as those described above and below. The graphics controller 900 may be a stand-alone processing device configured to provide at least a portion of the graphics control features described.

A particle analyzer 802, such as a flow cytometer or other biological particle measuring device, may be configured to acquire particle event data. For example, a flow cytometer may generate flow cytometric event data representing fluorescent intensity measurements for one or more wavelengths of light. The particle analyzer 802 may be configured to provide particle event data (e.g., particle measurements, experimental conditions, analyzer configuration, reagents, sample from which a particle was taken, etc.) to the graphics controller 900. A data communication channel may be included between the particle analyzer 802 and the graphics controller 900. The flow cytometric events may be provide to the graphics controller 900 via the data communication channel.

The graphics controller 900 may be configured to receive particle event data from the particle analyzer 802. The particle event data received from the particle analyzer 802 may include flow cytometric event data. The graphics controller 900 may be configured to provide a graphical display including one or more user interface for representing events to a display device 806 such as those shown in FIGS. 1-7 above. The graphics controller 900 may maintain the selection model for coordinating the selection of events across interfaces and plots.

The graphics controller 900 may be further configured to display the events on the display device 806 within a gate or collection location (e.g., well of a plate) differently from other events outside of the gate or collection location. For example, the graphics controller 900 may be configured to render the color of particle events contained within a gate to be distinct from the color of events outside of the gate. Similarly, if the user interface includes a collection plate interface, the graphics controller 900 may represent wells including selected particles in a different color that other wells. The display device 806 may be implemented as a monitor, a tablet computer, a smartphone, or other electronic device configured to present graphical interfaces.

The graphics controller 900 may be configured to receive a selection signal identifying the gate or well location from a first input device. For example, the first input device may be implemented as a mouse 810. The mouse 810 may initiate a selection event signal to the graphics controller 900 identifying a gate or a well. The selection event signal may be a click or a key stroke indicating the initiation of a selection.

After receiving the selection event signal, the graphics controller 900 may be configured to receive a subsequent event from the first input device or from another input device such as a keyboard 808. The subsequent event may indicate multiple selections to the graphics controller 900. For example, activation of a specific key or group of keys on the keyboard 808 may generate a specific triggering event. In response to the subsequent event, the graphics controller 900 may be configured to update the selection model to reflect the selected events shown on the interface and, if a change in events selected is detected, replace at least a first displayed on the display device 806 with a second plot.

The first and second input devices may be implemented as one or more of the mouse 810, the keyboard 808, or other means for providing an input signal to the graphics controller 900 such as a touchscreen, a stylus, an optical detector, or a voice recognition system. Some input devices may include multiple inputting functions. In such implementations, the inputting functions may each be considered an input device. For example, as shown in FIG. 8, the mouse 810 includes a right mouse button 812 and a left mouse button 813, each of which may generate a triggering event.

An event may cause the graphics controller 900 to alter the manner in which the data is displayed or which portions of the data is actually displayed on the display device 806 or both at the same time.

In some embodiments, the graphics controller 900 may be configured to detect when a selection is initiated by the mouse 810 using a first interface (e.g., collection plate interface or bi-variate plot). The graphics controller 900 may be further configured to automatically modify a second interface such that the selection on the first is also reflected in the second interface.

The graphics controller 900 may be connected to a storage device 804. The storage device 804 may be configured to receive and store particle event data from or via the graphics controller 900. The storage device 804 may be further configured to allow retrieval of particle events and particle event data by the graphics controller 900.

A display device 806 may be configured to receive display data from the graphics controller 900. The display data may comprise plots of particle events and gates outlining selected sections of the plots. A plot may refer to a visual representation of the events such as a bi-variate plot or collection plate interface. The display device 806 may be further configured to alter the information presented according to input received from the graphics controller 900 in conjunction with input from the particle analyzer 802, the storage device 804, the keyboard 808, and/or the mouse 810.

Figure 9:
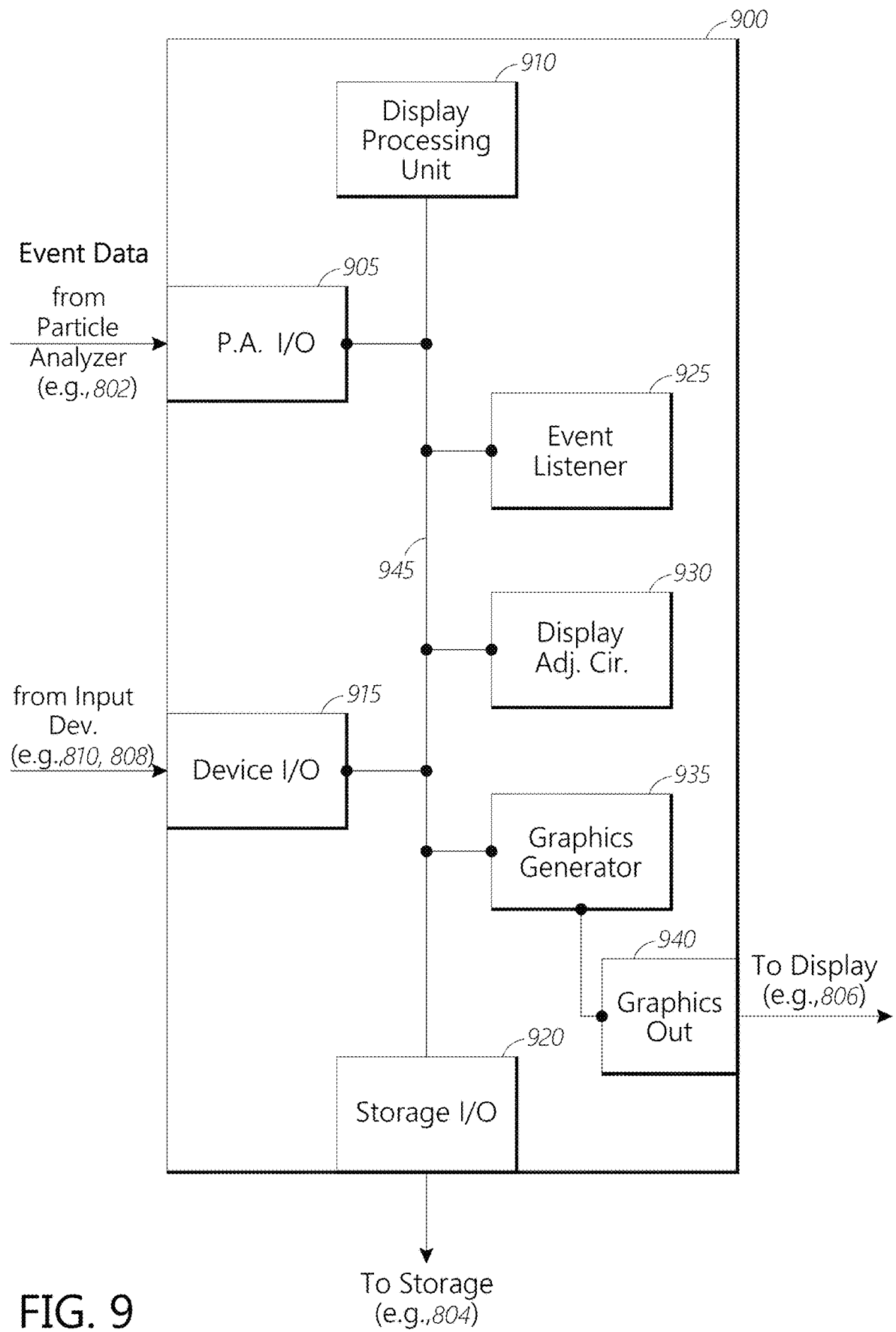
FIG. 9 shows a functional block diagram of an example of a graphics controller.

FIG. 9 shows a functional block diagram of an example of a graphics controller. The graphics controller 900 shown in FIG. 9 may be included in the system 800 shown in FIG. 8. The graphics controller 900 may be implemented as a specially configured device for dynamically adjusting a graphical display during event data processing. In some implementations, the graphics controller 900 may be integrated with the particle analyzer 802, a display device 806 (e.g., tablet computer, laptop computer, desktop computer), or other electronic hardware.

The graphics controller 900 includes a particle analyzer input/output (I/O) interface 905. The particle analyzer input/ output interface 905 is configured to receive cytometric event data from the particle analyzer, such as the particle analyzer 802 shown in FIG. 8. The particle analyzer I/O interface 905 may be a hardware interface providing a path for the event data to be received by the graphics controller 900. For example, the particle analyzer I/O interface 905 may be implemented as a network interface, a Universal Serial Bus interface, a serial data communication interface, a wireless communication interface (e.g., Bluetooth) memory access device, or other machine-to-machine communication interface. The data may be received in a standardized, machine readable format such as a comma separated list, a token separated list, mark-up language document, or a spreadsheet.

The particle event data received by the graphics controller 900 via the particle analyzer input/output interface 905 may be stored in a storage device such as the storage device 804 shown in FIG. 8. The graphics controller 900 may include a storage input/output (I/O) interface 920 to facilitate storage and retrieval of data to and from a storage device. For example, the storage I/O interface 920 may be implemented as a network interface, a Universal Serial Bus interface, a serial data communication interface, memory access device, or other machine-to-machine communication interface. In some implementations, the storage I/O interface 920 may be configured to generate queries to retrieve information requested by an element of the graphics controller 900. Such queries may be in a standardized query language such as Structured Query Language (SQL). In some implementations, the storage I/O interface 920 may be configured to generate storage commands to persist data in the storage device. SQL update or insert commands are examples of storage commands generated by the storage I/O interface 920.

A display processing unit 910 is shown in FIG. 9. The display processing unit 910 coordinates the activities of the graphics controller 900. For example, the display processing unit 910 may receive a signal that data has been received via the particle analyzer I/O interface 905. Upon detecting the signal, the display processing unit 910 may transmit an instruction to route the data to the storage I/O interface 920 for storage. The display processing unit 910 may coordinate the activities according to a preconfigured set of machine readable instructions.

The graphics controller 900 shown in FIG. 9 also includes a device input/output (I/O) interface 915. The device I/O interface 915 receives signals from input devices such as a mouse or keyboard. The display processing unit 910 may detect an input signal and adjust a display as will be described in further detail. One input signal may include a message to begin displaying particle event data. The input signal may include an identifier for the experiment or sample for which data should be displayed. Using this identifier, the event data may be retrieved such as via the storage I/O interface 920 or from the particle analyzer via the particle analyzer I/O interface 905.

An event listener 925 may be included in the graphics controller 900 to monitor the signals received via the device I/O interface 915. The event listener 925 may be configured such that signals from input devices may be translated into graphics adjustments. The graphics controller 900 may include multiple event listeners 925 to account for different system contexts. For example, a key press before any event data is displayed may be used to trigger loading of data. However, once data is initially displayed, the same key press event may cause a different system response.

The event listener 925 may include a registry of events and corresponding graphics control functions to trigger upon detection of the event. For example, the event listener 925 may be configured to detect a keystroke (e.g., control key pressed with the "L" key and the "H" key). The event listener 925 may be contextually aware. For example, the keystroke may trigger the graphics control function when detected in conjunction with another input signal (e.g., mouse selection, mouse location), system state (e.g., power on, plugged-in), data state (e.g., cytometry data loaded), display state (e.g., plot displayed, type of plot currently displayed), or the like. The registry may be persisted in memory and accessed by the event listener 925.

Upon detecting an input event and identifying a system response, the event listener 925 may transmit an instruction to the appropriate element or elements of the graphics controller 900. For example, if the event indicates receipt of particle event data, the event listener 925 may transmit a message to the storage I/O interface 920 to initiate storage of the received event data.

In some implementations, it may be advantageous to allow the display processing unit 910 to coordinate the system responses to detected events such as based on a selection model maintained by the graphics controller 900. This may be useful where multiple input signals may be received and arbitration is necessary to determine the order in which the events should be acted upon. The display processing unit 910 may be configured to manage the state changes using a state machine to represent the current status of the graphics controller 900 and possible next states.

Some events detected by the event listener 925 may be graphics control events. A display adjustment circuit 930 may be included to coordinate the adjustment of the graphic display of flow cytometric events from the current state to the adjusted state. The display adjustment circuit 930 may adjust the number of events displayed, the color of one or more events displayed, a plot type to use for displaying the events, the zoom level for the display, and the like.

The display adjustment circuit 930 may transmit the adjustments or selections and an identification of the events to display to a graphics generator 935. The graphics generator 935 may in turn generate one or more computer displayable graphic representations of the event data according to the adjustments or selections. The representations may then be provided to a display via a graphics output interface 940. The graphics output interface may be a video graphics array (VGA) interface, a high definition multimedia interface (HDMI), a wired or wireless network interface, or other communication means configured to provide graphics data, directly or indirectly, to a display device. In some implementations, the graphics generator 935 may be configured to further select events to display based on the display adjustment(s) or selection(s) being applied.

The elements included in the graphics controller 900 may be coupled by a bus 945. The bus 945 may be a data bus, communication bus, or other bus mechanism to enable the various components of the graphics controller 900 to exchange information. It will further be appreciated that while different elements have been shown, multiple features may be combined into a single element, such as the display adjustment circuit 930 and the graphics generator 935. Furthermore, additional elements may be included in the graphics controller 900 to support the features described. For example, a power source is not shown but may be included to provide power for the graphics controller 900. This can allow the graphics controller 900 to operate as a standalone graphics control hub to receive data from one or more cytometers, receive inputs from one or more input devices, and provide graphics to one or more display sources.

Data Event Stream and Selection

The data event stream may contain all of the information needed to render the interfaces representing the selected events. For large plates with large event volumes per well, the memory required to represent the events can be quite large. For this reason, the features described rely on one copy of the data thereby improving the resource utilization for graphical analysis of event data. Selections are performed using indexes into the data.

Figure 10:
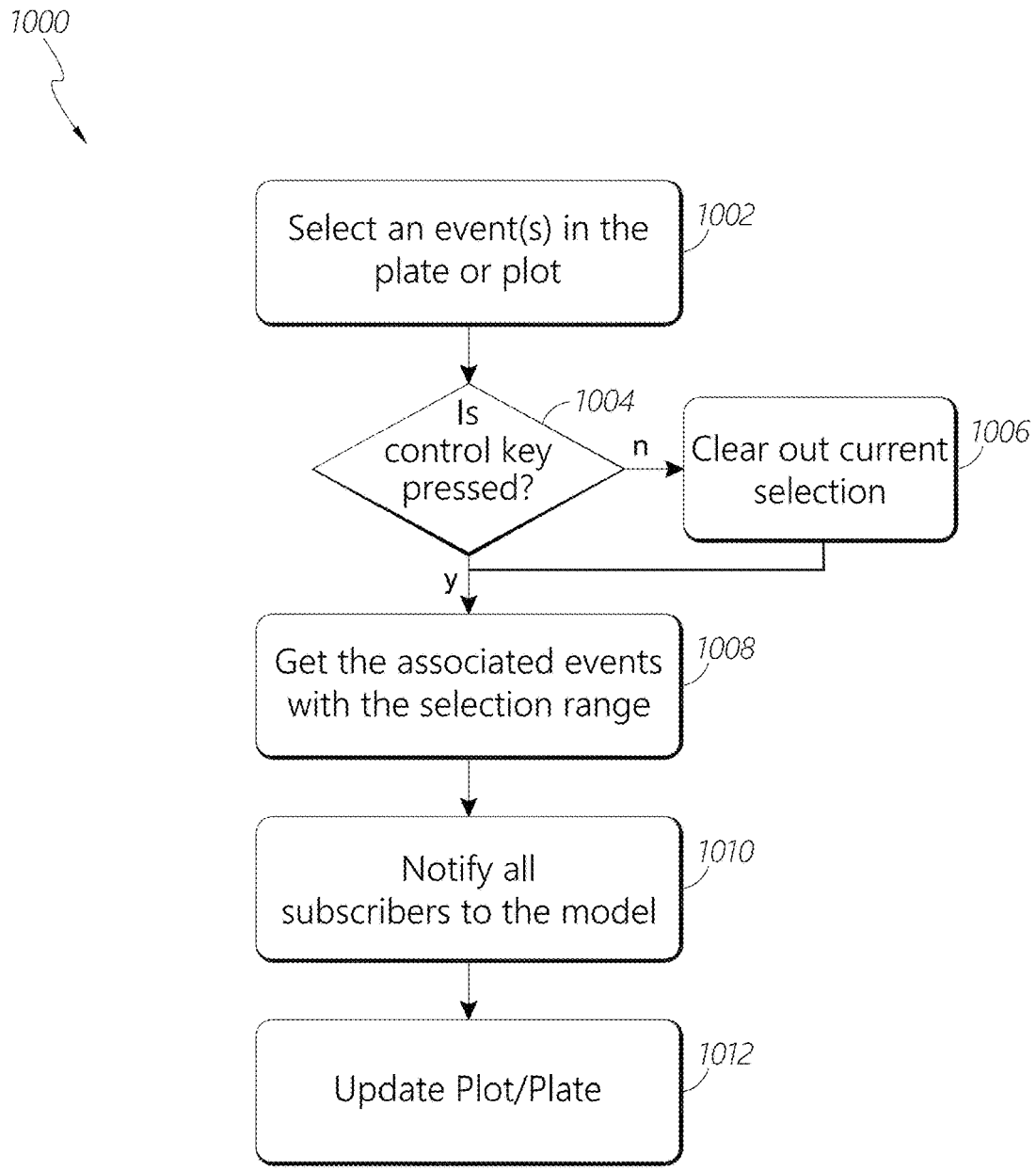
FIG. 10 is a flow diagram illustrating a method of coordinated rendering of a selection of events between two or more interfaces.

To perform the selection, enough information has to be present in the data stream. This includes the event information for each plot type such as:

X,Y location
Which plot each data point belongs to
The well information
The event id information FIG. 10 is a flow diagram illustrating a method of coordinated rendering of a selection of events between two or more interfaces. The method 1000 may be performed in whole or in part by one or more of the devices described such as the graphics controller 900. The method 1000 illustrates certain features which may be included to collect selection inputs and propagate selections to interested interfaces.

At block 1002, one or more events may be selected in an interface such as a collection plate interface or a bi-variate plot. The selection may be indicated using one or more messages from an input device as described.

At block 1004, the graphics controller may determine whether a predetermined input associated with additive selection is activated. For example, if a user presses the control key, an indication of the activation of the control key may be received in conjunction with the selection at block 1002. If the determination at block 1004 is negative, at block 1006, the graphics controller may clear a memory location storing selected events. The memory location may provide an index of selected events as described.

If the determination at block 1004 is affirmative or after clearing the memory location at block 1006, at block 1008, the graphics controller may obtain events associated with the selection range. In the case where the selection is provided using a control element of a collection plate, the selection range may be identified based on measurements of particles sorted into the activated well(s). In some implementations, a well may be associated with sorting logic which defines the range of measurements for sorting particles into respective wells. In the case where the selection is provided using a plot, the range may be indicated the range of measurements for the area selected within the two-dimensional or three-dimensional plot. Index values for events associated with the selection may be stored in the memory location identifying currently selected events.

At block 1010, the graphics controller may transmit one or more notification messages to subscribers to the selection model. For example, if a user interface include multiple representations of the particle event data, each interface may be adjusted to reflect the currently selected events. The adjustments may include changing color or shape of the events shown (e.g., highlight, dim, icon change, etc.) to make the selected events more visually prominent as compared to the non-selected events. The adjustments may include panning or zooming into an area of an interface showing the selected events.

At block 1012, the adjustments may be applied to update the visual representations (e.g., the collection plate plot or the bi-variate plot). The update may include adjusting interactivity for a particular interface. For example, if a well on a collection plate interface is selected, a subsequent activation of the well may indicate a de-selection of the well. In this way, update may change the message signaled by a control element upon activation.

By utilizing consistent tools and selection workflows, the speed and ease-of-use by which users can analyze index sort data is greatly enhanced. Bi-directional selection may be useful in visualizing where a cell is located both within a plate device and within the set of plots. The features described further provide an innovative solution to coordinating selections between visualizations and/or devices presenting interfaces including the same.

The workflow systems and methods described provide several non-limiting advantages. One non-limiting advantage with is that much more flexibility is provided for receiving input selections for a plate. Additionally the systems and methods allow coordinated selection of cell events directly on any plot(s) and accumulate these selections at the selection model. This bi-directional operation allows a sophisticated and coordinated selection of sorted events that can be built and visualized in a consistent way across interfaces. The result is a much faster discovery process for determining locations of sorted events.

The interfaces included in current index sort analysis systems offer very limited interaction with the data during the analysis phase. These may offer only a restricted and somewhat cumbersome set of selection options that work only on a plate device. In contrast, the features described include efficient and flexible selection tools/gestures to quickly receive selections of cell events from plate devices and one or more plots. The system may also identify a uniform gesture to append to a selection that is available for both the plate device and plot. The selected data may also be rendered faster and with higher visual distinctions than the current products.

Current index sort analysis is accomplished by allowing only selection within the plate device. Selection options are limited and are somewhat cumbersome to use. The features described include flexibility in receiving selections of events on the plate or the plot. For example plate selection can occur by selecting a well, row, column, or range of wells. Any combination may be provided. Non-contiguous selection can be accomplished by, for example, holding a specific key or key combination (e.g., the control key). Additionally, features may be provided to receive a selection of events in the plot and have corresponding wells (e.g., virtual or physical) show the selection. If the events are selected in the plot, and the corresponding events may not completely encompass the entire well event list. In such instances, the well may provide an indication of a partial selection and provide additional information about the selected cell events.

Aspects of the description focus on flow cytometers and flow cytometry event data. In some embodiments, the event data may correspond to other quantitative biological data indicating expression of a particular protein or gene. For example, the event data may indicate the presence of an mRNA sequence within a cell or across a mixed population of cells. The event data may identify an absolute number of gene transcripts of a transcriptome for a cell or cells. Presentation of the event data may be adjusted per cell or per gene expression to provide different perspectives on populations of event data of particular interest (e.g., associated with a particular mRNA sequence, taken from a specific cell, etc.). The event data may be generated using massively parallel single cell analytic features such as those described in U.S. Pat. No. 9,567,645 which is hereby incorporated by reference in its entirety. One commercially available single-cell analysis system is the Becton, Dickinson Rhapsody™ hardware by Becton, Dickinson and Company of Franklin Lakes, N.J. The features discussed may be applied to reconcile sorting decisions based on gene expression.

As used herein, the terms "determine" or "determining" encompass a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface, an interface, or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (e.g., send or receive data) in accordance with one or more of the aspects described.

As used herein, "system," "instrument," "apparatus," and "device" generally encompass both the hardware (e.g., mechanical and electronic) and, in some implementations, associated software (e.g., specialized computer programs for graphics control) components.

As used herein, an "event" generally refers to the data measured from a single particle, such as cells or synthetic particles. Typically, the data measured from a single particle include a number of parameters, including one or more light scattering parameters, and at least one fluorescence intensity parameters. Thus, each event is represented as a vector of parameter measurements, wherein each measured parameter corresponds to one dimension of the data space. In some biological applications, event data may correspond to quantitative biological data indicating expression of a particular protein or gene.

As used herein, a "population", or "subpopulation" of particles, such as cells or other particles, generally refers to a group of particles that possess optical properties with respect to one or more measured parameters such that measured parameter data form a cluster in the data space. Thus, populations are recognized as clusters in the data. Conversely, each data cluster generally is interpreted as corresponding to a population of a particular type of cell or particle, although clusters that correspond to noise or background typically also are observed. A cluster may be defined in a subset of the dimensions, e.g., with respect to a subset of the measured parameters, which corresponds to populations that differ in only a subset of the measured parameters.

As used herein, a "gate" generally refers to a boundary identifying a subset of data of interest. In cytometry, a gate may bound a group of events of particular interest. The group of events may be referred to a population. Further, as used herein, "gating" may generally refer to the process of defining a gate for a given set of data such as a via a user interface or plate and well selections.

As used herein, a phrase referring to "at least one of" a list of items refers to any combination of those items, including single members. As an example, "at least one of: a, b, or c" is intended to cover: a, b, c, a-b, a-c, b-c, and a-b-c.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as specifically programmed event processing computers, wireless communication devices, or integrated circuit devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable medium may be a non-transitory storage medium. The techniques additionally, or alternatively, may be realized at least in part by a computer-readable communication medium that carries or communicates program code in the form of instructions or data structures and that can be accessed, read, and/or executed by a computing device, such as propagated signals or waves.

The program code may be executed by a specifically programmed graphics processor, which may include one or more processors, such as one or more digital signal processors (DSPs), configurable microprocessors, an application specific integrated circuits (ASICs), field programmable logic arrays (FPGAs), or other equivalent integrated or discrete logic circuitry. Such a graphics processor may be specially configured to perform any of the techniques described in this disclosure. A combination of computing devices, e.g., a combination of a DSP and a microprocessor, a plurality of microprocessors, one or more microprocessors in conjunction with a DSP core, or any other such configuration in at least partial data connectivity may implement one or more of the features describe. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a specialized graphic control card.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A system for coordinated graphics control, the system comprising:
   one or more processing devices;
   a non-transitory computer readable medium storing instructions that, when executed by at least one of the one or more processing devices, cause the system to at least:
      receive an identifier for a collection vessel for receiving particles of a sample;
      cause display of a collection interface, wherein the collection interface includes a plurality of interactive elements, each interactive element of the plurality of interactive elements corresponding to a collection location of the collection vessel;
      receive, from an input device, a selection event identifying an interactive element included in the plurality of interactive elements; and
      cause display of a second interface for presenting a measurement for a particle of the sample, the measurement corresponding to a portion of the particles of the sample, wherein the portion of the particles sorted into a collection location corresponding to the interactive element selected includes the particles;
      further cause display of the second interface by at least:
         causing display of the portion of particles according to a first graphical scheme; and
         causing display of another portion of the particles according to a second graphical scheme, wherein the first graphical scheme is perceivably different from the second graphical scheme;
      receive, from an input device, a selection control signal indicating a second selection event that will be received;
      receive, from the input device, the second selection event identifying a second portion of the particles;
      add the second portion of the particles to the portion of the particles; and
      update at least one of the second interface or the collection interface to identify the second portion of the particles.

2. The system of claim 1, wherein the identifier for the collection vessel is received as metadata for a file including the measurement for the particle, and wherein receiving the identifier comprises receiving the file from a particle analyzer.

3. The system of claim 1, wherein the instructions further cause the system to at least:
   receive a first registration message for the collection interface;
   receive a second registration message for the second interface; and
   upon detecting the selection event, notify at least one of the second interface or the collection interface of the selection event.

4. The system of claim 1, wherein the second selection event includes an interface identifier indicating which interface was used to collect the second selection event.

5. The system of claim 4, wherein the interface identifier identifies the second interface and wherein the second selection event defines a range of particle measurement values.

6. The system of claim 5, wherein the second interface comprises a bi-variate plot, and the range is defined using a geometric shape for an area of the bi-variate plot.

7. The system of claim 1, wherein the instructions further cause the system to at least:
   generate a display property for the collection location based at least in part on at least one of: (i) a measurement of particles included in the collection location or (ii) a number of particles included in the collection location.

8. A computer-implemented method for coordinated graphics control, the method comprising:
   under control of one or more processing devices,
   receiving an identifier for a collection vessel for receiving particles of a sample;
   causing display of a collection interface, wherein the collection interface includes a plurality of interactive elements, each interactive element corresponding to a collection location of the collection vessel;
   receiving a message from an input device, the message including a selection event, the selection event identifying an interactive element included in the plurality of interactive elements; and
   causing display of a second interface for presenting a measurement for a particle of the sample, the measurement corresponding to a portion of the particles sorted into a collection location corresponding to the interactive element selected, wherein the portion of the particles includes the particle, wherein causing display of the second interface comprises:
  causing display of the portion of particles according to a first graphical scheme; and
  causing display of another portion of the particles according to a second graphical scheme, wherein the first graphical scheme is perceivably different from the second graphical scheme;
receiving, from an input device, a selection control signal indicating a second selection event will be transmitted;
receiving, from the input device, the second selection event identifying a second portion of the particles;
adding the second portion of the particles to the portion of the particles; and
updating at least one of the second interface or the collection interface to identify the second portion of the particles.

9. The computer-implemented method of claim 8, wherein the identifier for the collection vessel is received as metadata for a file including the measurement for the particle, and wherein receiving the identifier comprises receiving the file from a particle analyzer.

10. The computer-implemented method of claim 8, further comprising:
  receiving a first registration message for the collection interface;
  receiving a second registration message for the second interface; and
  upon detecting the selection event, notifying at least one of the second interface or the collection interface of the selection event.

11. The computer-implemented method of claim 8, wherein the second selection event includes an interface identifier indicating which interface was used to collect the second selection event.

12. The computer-implemented method of claim 11, wherein the interface identifier identifies the second interface and wherein the second selection event defines a range of particle measurement values.

13. The computer-implemented method of claim 12, wherein the second interface comprises a bi-variate plot, and the range is defined using a geometric shape for an area of the bi-variate plot.

14. The computer-implemented method of claim 8, further comprising:
  generating a display property for the collection location based at least in part on at least one of: (i) a measurement of particles included in the collection location or (ii) a number of particles included in the collection location.

* * * * *